(12) United States Patent
Ishida et al.

(10) Patent No.: US 7,837,229 B2
(45) Date of Patent: Nov. 23, 2010

(54) WRAPPING SHEET

(75) Inventors: Ryotaro Ishida, Aichi-ken (JP); Takeshi Ando, Aichi-ken (JP); Yoshinori Nonoyama, Aichi-ken (JP); Michiyasu Ito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 138 days.

(21) Appl. No.: 12/230,344

(22) Filed: Aug. 28, 2008

(65) Prior Publication Data
US 2009/0058048 A1  Mar. 5, 2009

(30) Foreign Application Priority Data
Aug. 31, 2007  (JP) .............................. 2007-227153

(51) Int. Cl.
*B60R 21/237* (2006.01)
(52) U.S. Cl. ............... 280/743.1; 280/728.1; 280/730.1
(58) Field of Classification Search .............. 280/728.2, 280/728.1, 730.1, 743.1; 493/449, 457, 458
See application file for complete search history.

(56) References Cited

U.S. PATENT DOCUMENTS 7,658,408 B2 * 2/2010 Zofchak et al. .......... 280/743.2

2004/0195808 A1 * 10/2004 Amamori ................. 280/728.2
2004/0207186 A1 * 10/2004 Kai ............................ 280/731

FOREIGN PATENT DOCUMENTS

| JP | A-2002-187512 | 7/2002 |
|---|---|---|
| JP | A-2004-314763 | 11/2004 |
| JP | A-2006-044612 | 2/2006 |

* cited by examiner

*Primary Examiner*—Ruth Ilan
*Assistant Examiner*—Keith Frisby
(74) *Attorney, Agent, or Firm*—Posz Law Group, PLC

(57) ABSTRACT

A wrapping sheet is to be torn by the inflation of an air bag. Since attachment shafts, used to hold the folded air bag in position, are projected from the air bag, an engagement portion of the wrapping sheet is fitted on the attachment shafts, and the shape of a folding completed body of the air bag is maintained. The wrapping sheet includes not only the engagement portion, but also a coupled portion to be connected to the air bag, and a folding form control portion, which has an auxiliary engagement portion to be fitted on the attachment shafts. When the auxiliary engagement portion is fitted on the attachment shafts, the shape of the air bag that is being folded is adjusted.

6 Claims, 16 Drawing Sheets

WRAPPING SHEET

BACKGROUND OF THE INVENTION

1. Field of the Invention

The present invention relates to a wrapping sheet used to wrap and maintain a fully folded air bag, but that, as the air bag is being inflated, tears under the pressure exerted by the expanding air bag.

2. Related Art

Conventionally, a wrapping sheet includes an engagement piece that is fitted on attachment shafts projecting from an air bag, and when the engagement piece for the wrapping sheet has been fitted on the attachment shafts, the air bag, for which folding has been completed, is retained, undisturbed, within the wrapping sheet. The attachment shafts projecting from the air bag can be either retainer bolts or defuser bolts, and are employed to secure the folded air bag in a storage portion. Furthermore, one presently available conventional wrapping sheet has not only as a function for preventing the disarrangement of a folded air bag, but also as a protective cover, which when the folded air bag is inflated from a storage case, prevents damage to the air bag by the storage case (see, for example, JP-A-2004-314763).

Another conventional wrapping sheet serves as means for adjusting the shape of an air bag when inflated, from the folded state, and propelled outward from the storage portion (see, for example, JP-A-2002-187512).

There is one other conventional wrapping sheet that is not used for maintaining the shape of a folded air bag, but wraps part of the folded air bag by coupling that part with a portion of the wrapping sheet, and provides a sealing function for preventing the leakage of an air bag inflation gas (see, for example, JP-A-2006-044612).

With the conventional wrapping sheets referenced above, although each of these wrapping sheets can satisfactorily wrap and prevent the disarrangement of a folded air bag, adjusting the position of such a wrapping sheet during a folding process is not possible. Therefore, to ensure that an air bag will have a predetermined shape when the folding process has been completed, an improved folding process is required.

SUMMARY OF THE INVENTION

To resolve the above problem, one objective of the present invention is to provide a wrapping sheet that ensures an air bag folding process can be easily and steadily performed until the folding has been completed and a predetermined shape obtained.

According to the present invention, provided is a wrapping sheet that is to wrap and maintain the shape of an air bag for which folding has been completed, but that is to tear when subjected to pressure exerted by the air bag while being inflated, wherein an engagement piece is fitted on attachment shafts, projecting from the air bag, for attachment to a storage portion for storing the folded air bag, so that when the engagement piece has been fitted on the attachment shafts, the shape of the folded air bag can be maintained, as completed;

wherein a coupling portion is arranged for coupling with part of the air bag, and the engagement piece is located at a portion extending from the coupled portion; and wherein a folding form control portion includes an auxiliary engagement portion to be fitted either to the attachment shafts or to a jig in a vicinity of the folded air bag, and engages the auxiliary engagement portion with the attachment shafts, or the jig, in order to adjust the shape of the air bag while being folded.

According to the wrapping sheet of this invention, the folded form control portion is employed while an air bag is being folded, and the auxiliary engagement portion is fitted either to the attachment shafts or to the predetermined jig while the coupled portion is being pulled. As a result, the shape of the air bag is stably controlled during the folding process, and discrepancies in the shape of the air bag are prevented at successive folding steps. Thus, the air bag will be correctly and neatly folded, and once the folding process has been completed, will be shaped to fit the intended storage portion. Then, following the completion of the folding process, the folded air bag having been stored, the engagement piece is fitted on a predetermined attachment shaft, to insure that the shape of the air bag will be securely retained, undisturbed, in the storage portion. As a result, the unimpeded inflation of the air bag, from the folding completed state, can proceed smoothly and rapidly.

Furthermore, since the folding form control portion is not separately provided, being integrally formed with the wrapping sheet, this portion can easily be employed while the folding process is being performed, and when that has been completed, the shape of the air bag is controlled using the wrapping sheet, which is employed to wrap and maintain, and prevent the disarrangement of the folded air bag. While it should be noted, of course, that during the folding process only the control function for maintaining the predetermined shaping of the air bag is required of the folding form control portion, it should also be noted that when the folding form control portion is correctly arranged, there is no deterioration of the function required of the wrapping sheet, i.e., the ease with which the sheet, which prevents the folded air bag from being disarranged, is torn by the inflation of the air bag.

Therefore, since the wrapping sheet of this invention can control the shape of an air bag that is being folded, the folding process, during which the shaping of the air bag is initiated and completed, can be smoothly and easily performed.

In this invention, the air bag in the flat state can be folded through a plurality of folding steps. When, at the next to last step, the coupled portion is positioned on the outer face of a folded portion of the air bag, the auxiliary engagement portion of the folding form control portion is employed as an auxiliary, attachment shaft engagement portion, which is to engage the attachment shaft when the coupled portion is positioned to the outer wall of the folded portion of the air bag. And when the auxiliary, attachment shaft engagement portion is fitted to the attachment shafts, a section from the coupled portion to the auxiliary, attachment shaft engagement portion is employed as an auxiliary wrapping section that wraps the folded portion, so that the disarrangement of the folded portion is prevented.

With this arrangement, the auxiliary, attachment shaft engagement portion, which is attached to the folding form control portion, is fitted on the attachment shaft, and the section from the coupled portion to the auxiliary, attachment shaft engagement portion, is provided as an auxiliary wrapping section. Therefore, during the folding process, this section can be wrapped around the air bag to prevent the shape of the folded portion from being disarranged. Thus, the succeeding folding steps can be appropriately performed without the shape being deteriorated, and a compact, precisely shaped and folded air bag can be provided that is more smoothly and easily completed.

In this invention, the coupled portion is to be located along an end edge of the folded portion when the auxiliary, attachment shaft engagement portion is fitted on the attachment shafts. The engagement piece is fitted on the attachment shafts, so that the coupled portion is exposed at an end edge of a body of the air bag in the folding completed shape.

According to this arrangement, so long as the coupled portion is positioned at the end edge of the folded portion during the process for folding the air bag, it can be easily ascertained that the air bag is being correctly folded using a predetermined fold width and in a predetermined shape. Further, at the completion of folding, so long as the coupled portion is located at the end edge of the body of the air bag that has been folded, it can be easily ascertained that folded portions are not disarranged, and that the entire air bag is properly folded.

In addition, the coupled portion is located at a portion of the air bag that becomes a convex fold, and the auxiliary engagement portion of the folding form control portion is employed as an auxiliary, attachment shaft engagement portion that is to engage the attachment shafts during the process for folding the air bag. Furthermore, when a portion of the air bag is extracted to form a convex fold during the folding process, the auxiliary, attachment shaft engagement portion engages the attachment shafts. In addition, when the auxiliary, attachment shaft engagement portion is fitted on the attachment shafts, the section from the coupled portion to the auxiliary, attachment shaft engagement portion is provided as a fold forming portion that extracts a portion of the air bag and forms a convex fold.

With this arrangement, during the folding process, the auxiliary, attachment shaft engagement portion, of the folding form control portion, that serves as the fold setting portion is fitted on the attachment shafts. Therefore, a convex fold can be easily formed at a predetermined position of the air bag at which the coupled portion is located, so that the air bag can be quickly folded. Moreover, since the convex fold of the air bag is located at the predetermined position, stable movement from the folded state to the inflated is obtained for each air bag.

In addition, when a plurality of folding steps are to be performed on a work table used for folding an air bag, beginning with a flat state and by reversing the sides, the auxiliary engagement portion of the folding form control portion is employed as an auxiliary, jig engagement portion that engages, during a folding process, a jig that is located on the work table. Further, when the auxiliary, jig engagement portion engages the jig, a folded portion near the coupled portion is securely fixed. Further, when the air bag has been folded, the auxiliary, jig engagement portion is also employed as an engagement piece that engages the attachment shafts to maintain the air bag in shape when the folding process has been completed.

According to this arrangement, the auxiliary, jig engagement portion of the folding form control portion engages the jig on the work table, and the portion near the coupled portion of the air bag that is being folded can be secured. Therefore, when the sides of the air bag are reversed, the air bag can be easily and smoothly folded without being misaligned near the coupled portion. Moreover, since the auxiliary, jig engagement portion can be employed as an engagement piece, the wrapping sheet can be shaped more compactly, compared with when the auxiliary engagement portion and the engagement piece are separately provided.

DETAILED DESCRIPTION OF THE PREFERRED EMBODIMENTS

Figure 1:
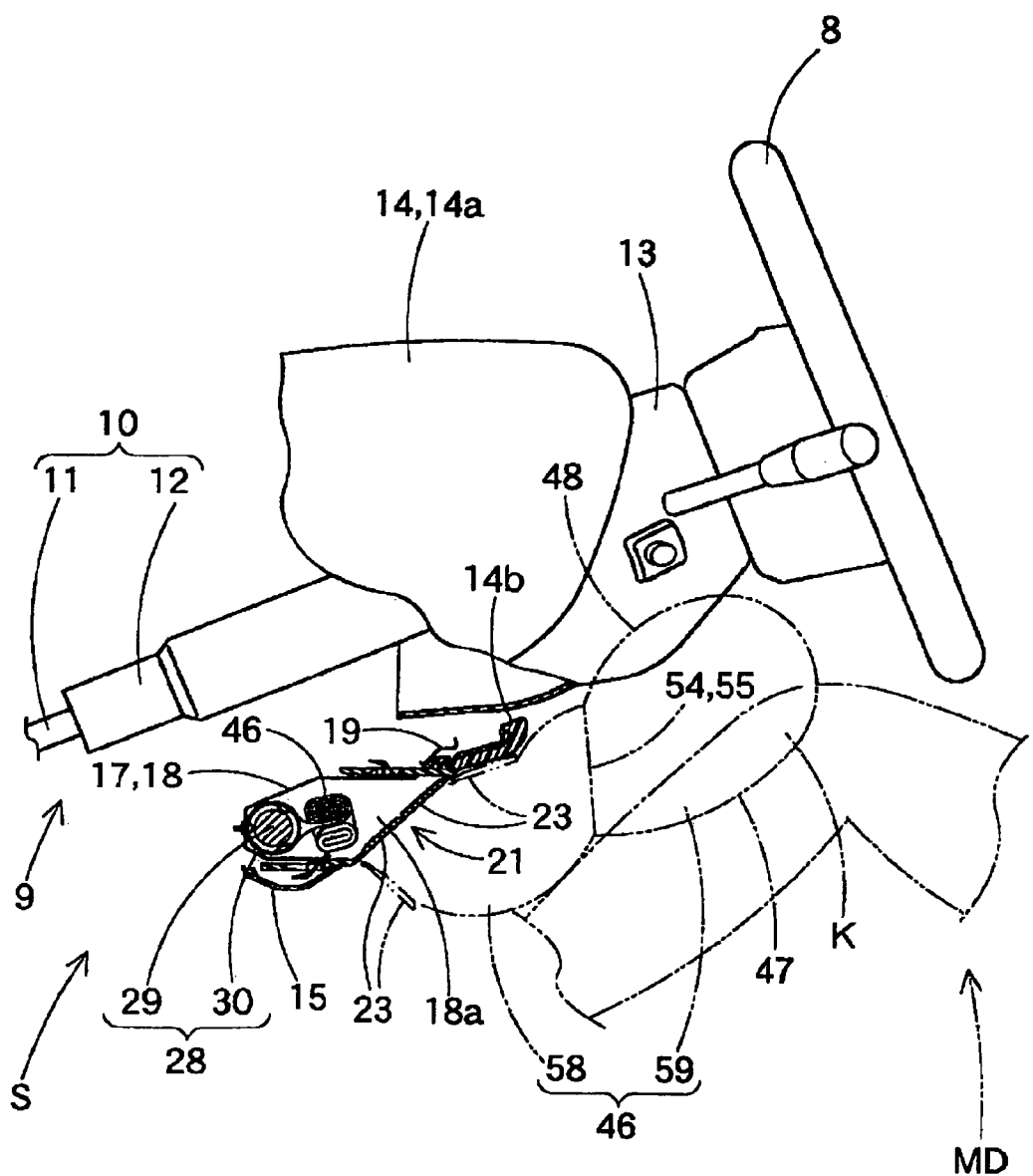
FIG. 1 is a schematic vertical cross-sectional view of a knee protection air bag system that includes an air bag enclosed by a wrapping sheet according to a first embodiment of the present invention, showing the state in a longitudinal direction of a vehicle on which the air bag system is mounted.
Figure 2:
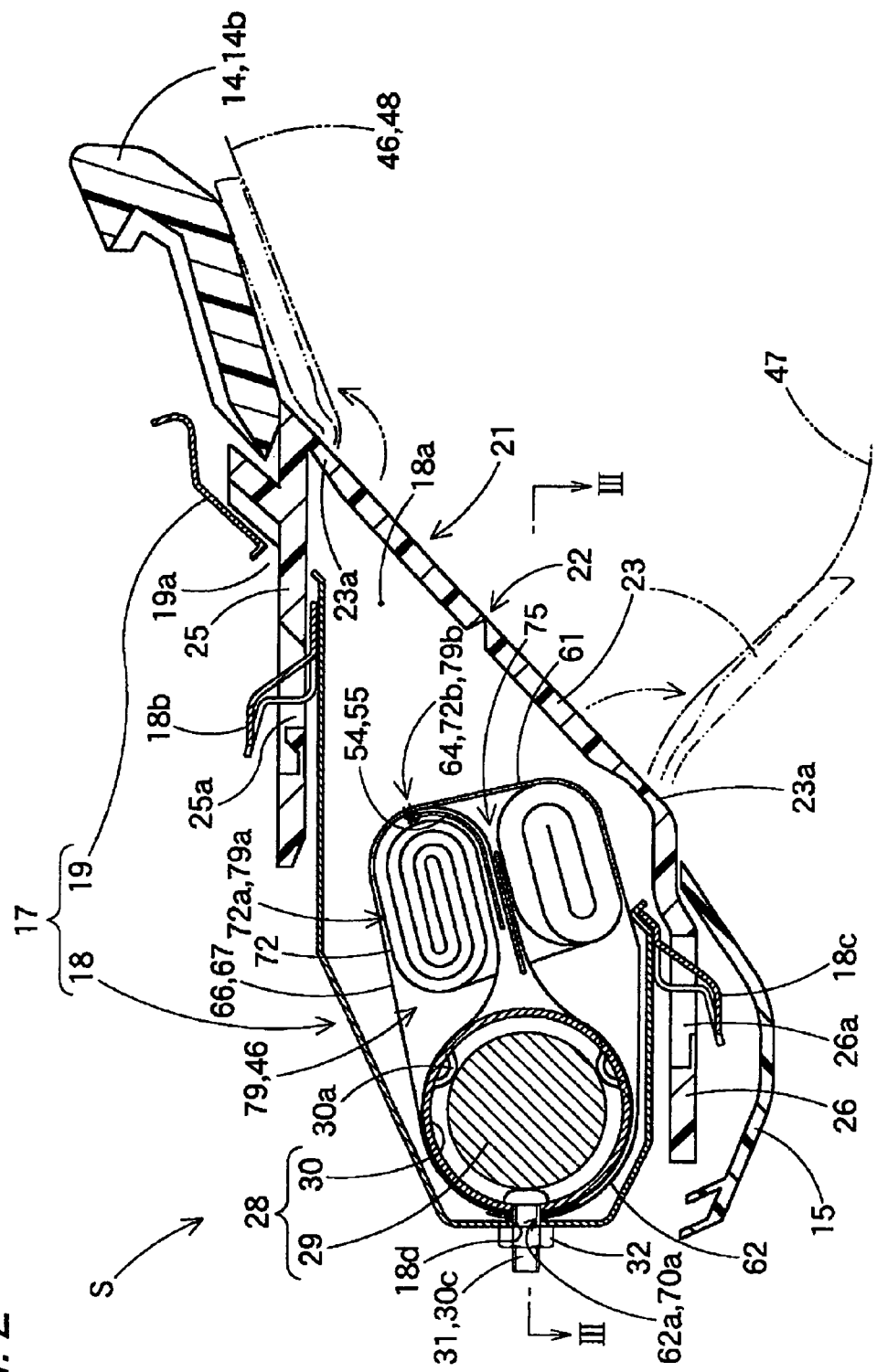
FIG. 2 is a schematic, enlarged vertical cross-sectional view of the knee protection air bag system, taken in the longitudinal direction of the vehicle.
Figure 4:
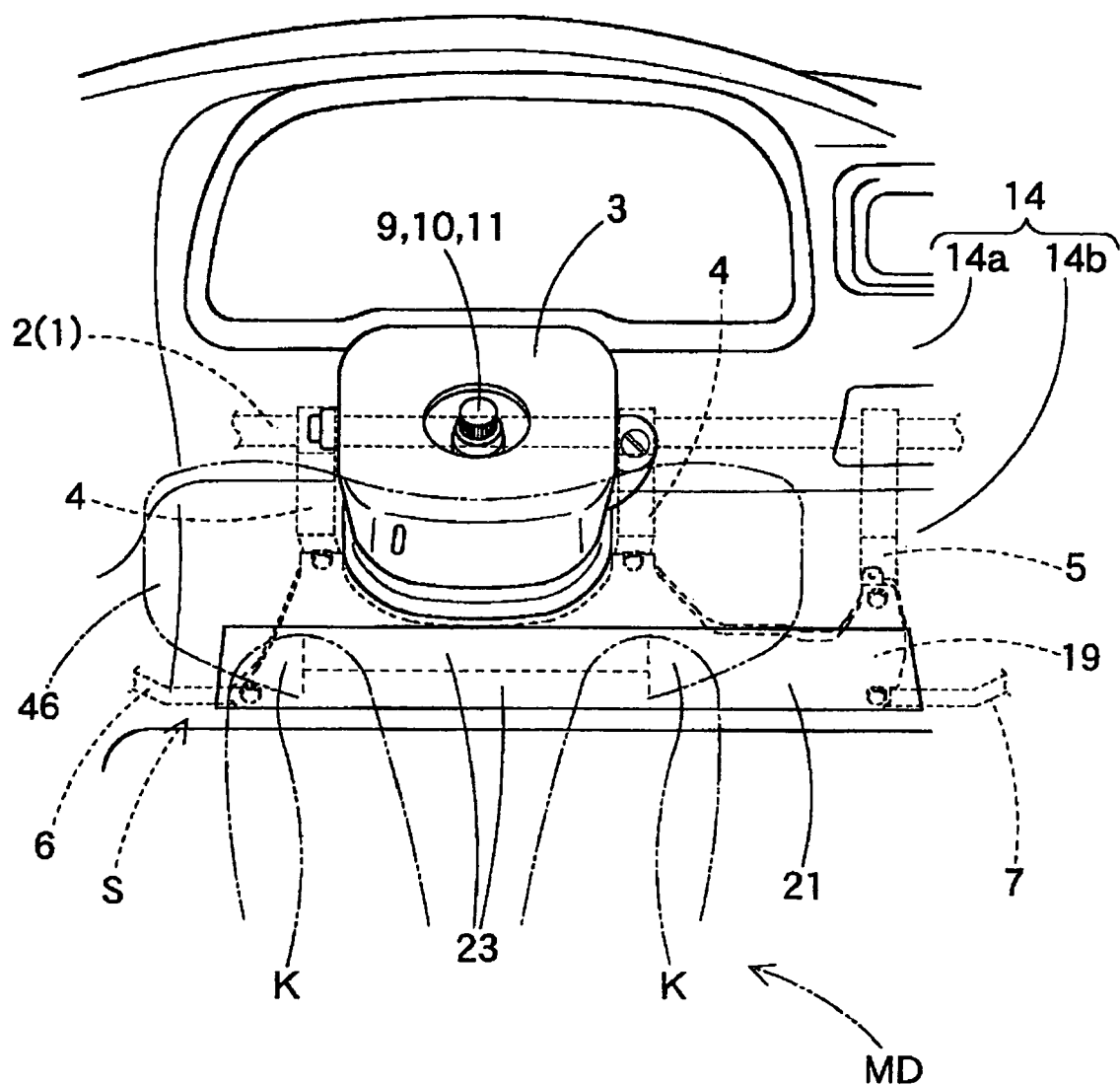
FIG. 4 is a schematic view, taken from the rear of the vehicle, of the usage state of the knee protection air bag system.

The preferred embodiments of the present invention will now be described while referring to drawings. According to a first embodiment of this invention, as shown in FIG. 2, a wrapping sheet 61 is employed to prevent the disarrangement of the shape of a folded air bag 46 for a knee protection air bag system S. As shown in FIGS. 1 and 4, the knee protection air bag system S, for protecting the knees K of a vehicle driver MD, is provided below a steering column 9 to the front of the vehicle driver MD.

As shown in FIG. 1, the steering column 9 includes: a column main body 10 coupled with a steering wheel 8; and a column cover 13 provided to cover the column main body 10, which extends forward and obliquely downward from below the steering wheel 8. The column main body 10 is formed of a main shaft 11 and a column tube 12, which circumferentially covers the main shaft 11. The column cover 13 is a nearly square synthetic resin sleeve that extends toward the rear, in the axial direction of the column main body 10, and covers the column main body 10 between an instrument panel 14 and the steering wheel 8.

Figure 3:
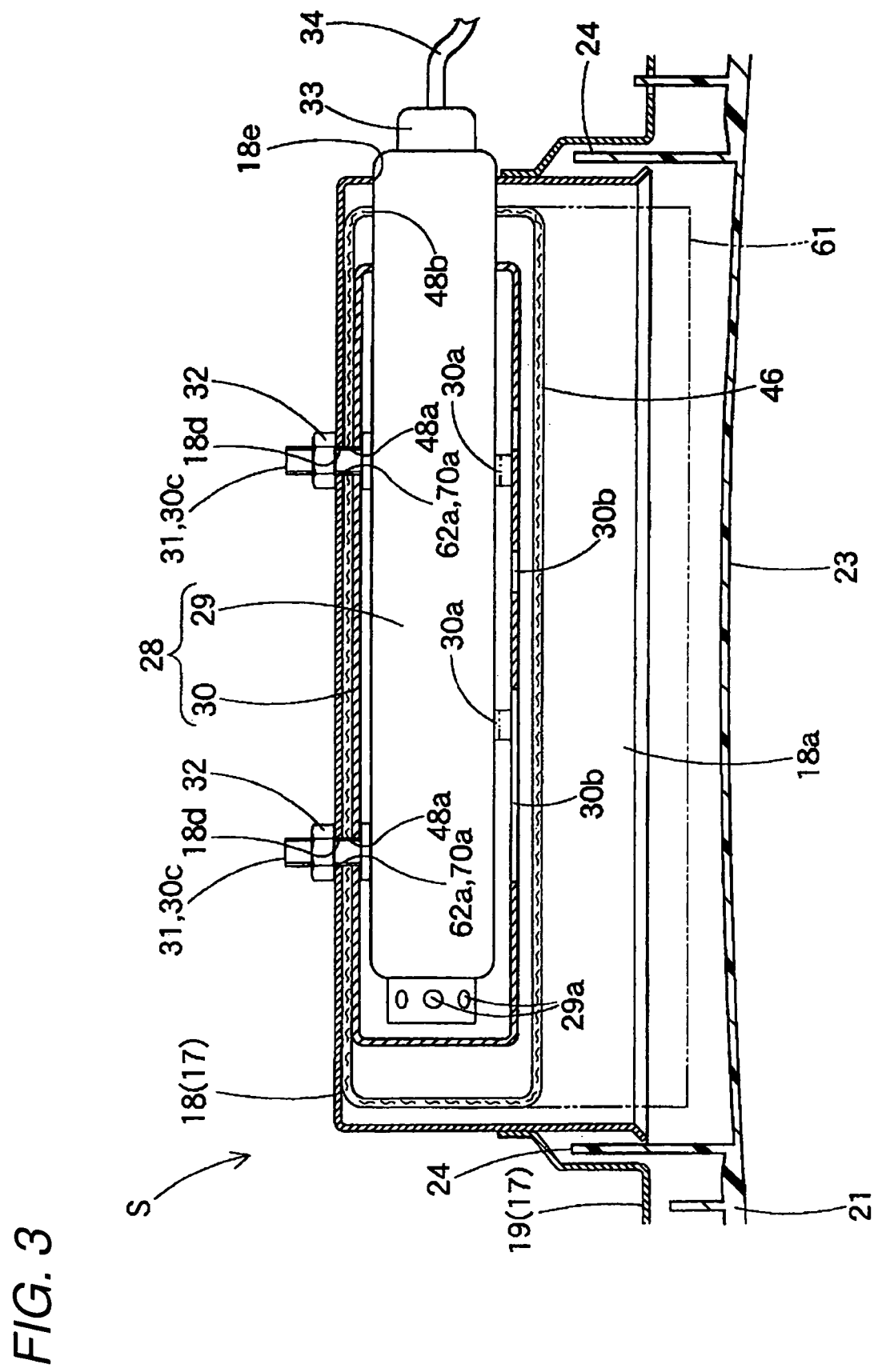
FIG. 3 is a schematic cross-sectional view taken along line III-III in FIG. 2.

Further, as shown in FIGS. 1 to 3, the knee protection airbag system S also includes: the air bag 46, which is folded; an inflator 28, for supplying an inflation gas to the air bag 46; a case 17, in which the folded air bag 46 and the inflator 28 are stored, and which has an opening 18a directed toward the rear of the vehicle; and an air bag cover 21, which covers the opening 18a.

In the specifications for this invention, positional siting and directional bearing terms using, e.g., upper and lower, front and rear, and right and left, provide existing conditions in a state wherein the knee protection air system S has been mounted in a vehicle. Thus, the terms used are descriptive of conditions relevant to the air bag system S layout or to the interior of the vehicle.

As shown in FIGS. 2 and 3, the case 17 is formed from sheet metal, and is provided, below the steering column 9 (see FIG. 1), as a storage portion for the folded air bag 46, which includes a box-shaped main body 18 and a panel portion 19 (see FIG. 4) that extends outward from the main body 18. The main body 18 is a closed-end, nearly square sleeve having a substantially rectangular opening 18a that is directed towards the rear of the vehicle. Also, arranged on the upper and lower outer walls of the main body 18 are a plurality of hooks 18b and 18c that are employed to assemble, with the case 17, upper and lower contiguous walls 25 and 26 of the air bag cover 21, which will be described later. The hooks 18b and 18c are inserted into engagement holes 25a and 26a in the contiguous walls 25 and 26 of the air bag cover 21, and are held by the circumferential edges of the engagement holes 25a and 26a.

Furthermore, two attachment holes 18d are formed in the back wall of the main body 18, at a distance from the opening 18a, into which bolts 30c for the inflator 28 are inserted. In addition, an insertion hole 18e is formed in the right wall of the main body 18 for the insertion, on the connector 33 side, of the end of a main body 29 for the inflator 28, which will be described later (see FIG. 3).

The panel portion 19 is arranged so as to enclose the opening 18a of the main body 18 of the case 17, and as shown in FIG. 4, brackets 4, 5, 6 and 7 are extended from an instrument panel reinforcement rod 2 on a vehicle body 1 and are coupled, at five places, to the outer edge of the panel portion 19 to securely connect the case 17 to the vehicle body 1. Further, an insertion hole 19a is formed in the panel 19, above the main body 18, for the insertion of the contiguous wall 25 of the air bag cover 21 as shown in FIG. 2.

The air bag cover 21 is formed, for example, of an olefin thermoplastic elastomer, and is mounted on the case 17, covering the side facing the rear of the vehicle. The air bag cover 21 is further positioned below the instrument panel 14, formed of an upper panel 14a and a lower panel 14b, and near the lower panel 14b (see FIGS. 2 and 4). For the air bag cover 21, a double door 23, which opens vertically at hinges 23a, is arranged across the rear of the opening 18a in the case 17, and substantially at the center of the door 23 is a thin, easily broken H shaped (when viewed from the rear) portion 22. Cover walls 24, 24 and the contiguous walls 25 and 26, extend around the door 23, 23 and enclose the main body 18 of the case 17 (see FIGS. 2 and 3). The cover walls 24 are formed to cover the right and left sides of the main body 18, while the contiguous walls 25 and 26 are formed to cover the top and the bottom of the main body 18. As previously described, the engagement holes 25a and 26a, formed in the contiguous walls 25 and 26, are provided so that the hooks 18b and 18c, formed on the upper and lower walls of the main body 18, can be inserted into, and their edges held by, the engagement holes 25a and 26a.

The inflator 28 has a substantially cylindrical main body 29 that is inserted into a like shaped defuser (retainer) 30 that is longitudinally parallel to a line extending from the right to the left of a vehicle, as shown in FIGS. 2 and 3. A plurality of gas discharge ports 29a are formed at one end of the main body 29 (the left end in this embodiment), while attached at the other end is a connector 33 for a lead line 34, over which an operating signal is input. The defuser 30 is a sheet metal, nearly cylindrical form, employed to cover the main body 29, that includes clamping portions 30a, for holding and preventing movement of the main-body 29; multiple gas outlets 30b, through which inflation gas, discharged from the gas discharge ports 29a of the main body 29, is released to the rear; and a plurality of bolts 30c (two in first embodiment), which are projected to the front.

When an air bag operating circuit mounted in a vehicle detects a front vehicle collision, an operating signal is transmitted, via the lead 34, to the inflator 28, as well as to an air bag system (not shown) mounted on the steering wheel 8.

Nuts 32 are used to secure the bolts 30c of the defuser 30, so that the air bag 46, after being folded, and the inflator 28 can be stored in the main body 18 of the case 17, which serves as a storage portion. Thus, when the nuts 32 have been tightened on the individual bolts 30c, the folded air bag 46 and the inflator 28 are securely held in the main body 18 of the case 17. That is, in the first embodiment, the bolts 30c constitute attachment shafts 31 that project outward from an air bag 46 that has been folded.

Figure 5:
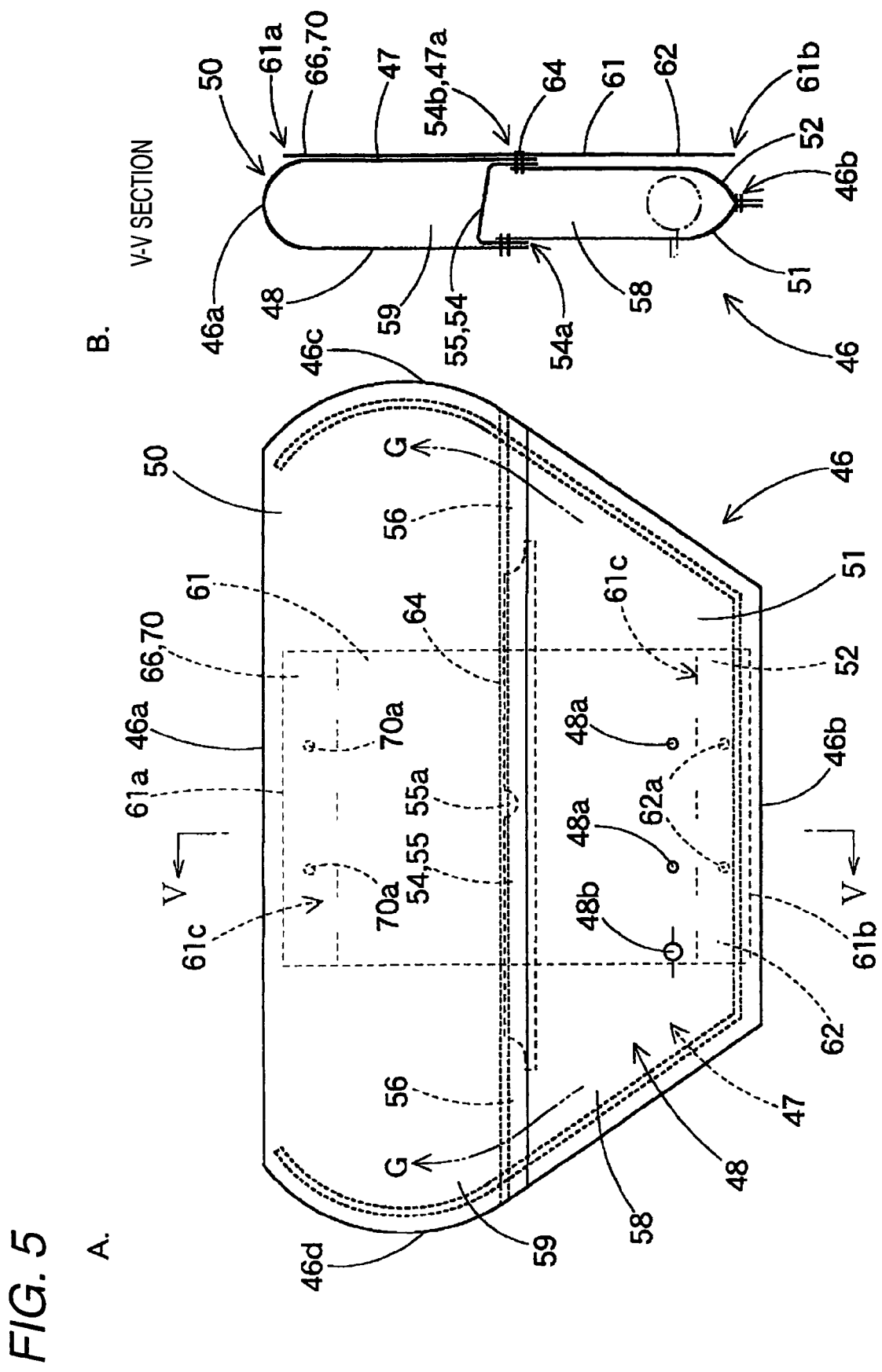
FIG. 5 is a front view and a vertical cross-sectional view of an air bag used for the first embodiment.

As shown in FIGS. 5 (A and B), the air bag 46 is made of a fabric, such as flexible polyester or polyamide, and has a pentagon shape for which the lower end is the narrowest when fully inflated. The air bag 46 includes: an occupant-side wall 47, located on the driver MD side; and a vehicle-side wall 48, located on the column cover 13 side (see the dash, double-dot line in FIG. 1). Attachment holes 48a, 48a are formed in the vehicle-side wall 48, near a lower edge 46b of the air bag 46, in order for the attachment shafts 31, 31 of the inflator 28 to be projected outward. Also, an insertion hole 48b is formed in the vehicle-side wall 48, and is provided for the projection, on the connector 33 side, of the end of the main body 29 of the inflator 28 (see FIG. 3).

A tether 54, provided for the air bag 46, controls the interval between the occupant-side wall 47 and the vehicle-side wall 48 when the air bag 46 is fully inflated, i.e., controls the thickness so that the air bag 46 is expanded, plate like. The tether 54 is vertically arranged, near the middle of the air bag 46, and horizontally, like a belt extending from the left to the right, so as to connect the occupant-side wall 47 to the vehicle-side wall 48. In addition, the tether 54 vertically divides the air bag 46, so that the portion of the air bag 46 below the tether 54 is defined as an upstream chamber 58, wherein there is an upstream flow of an inflation gas G, and so that the portion above the tether 54 is defined as a downstream chamber 59, wherein there is a downstream flow of the inflation gas G. That is, the tether serves as a partition wall 55 used to define the upstream chamber 58 and the downstream chamber 59. And the area that actually protects the knees K of the driver MD is mainly the downstream chamber 59.

Further, for the air bag 46, provided to the right and to the left of the tether 54, which also serves as the partition wall 55, are gas guide holes 56, 56 through which inflation gas G supplied to the upstream chamber 58 is guided into the downstream chamber 59. These left and right guide holes 56, 56 direct inflation gas G for the downstream chamber 59, along respective left and right edges 46c and 46d, to an upper edge 46a of the air bag 46. Therefore, when inflation gas G is released to inflate the air bag 46, first, the upstream chamber is expanded to the left and right, and then, the inflation gas G is channeled, through the gas guide holes 56, 56, into the downstream chamber 59. Following this, the downstream chamber 59 is expanded to the sides until it reaches the upper edge 46a of the air bag 46, and is then expanded in the direction of its thickness. The air bag 46 is inflated in this manner, but it should be noted that in the horizontal center of the partition wall 55, a small gas distribution hole 55a is formed through which the inflation gas G can be released upward. With this arrangement, a required thickness at the horizontal center of the downstream chamber 59, near the partition wall 55, can be obtained.

The fabric assembly for the outer wall of the air bag 46 consists of three pieces: an upper cloth 50, a lower front cloth 51 and a lower rear cloth 52. The upper cloth 50 is a single sheet that connects the occupant-side wall 47 to the vehicle-side wall 48, in the area above the tether 54, with the upper edge 46a of the air bag 46 between them. The lower front cloth 51 corresponds to the portion of the vehicle-side wall 48 and the lower rear cloth 52 corresponds to the portion of the occupant-side wall 47 that are below the tether 54. To make the air bag 46, the upper cloth 50 is folded back at a location corresponding to the upper edge 46a of the air bag 46, and is sewed along the right and left edges. Then, the front end 54a and the rear end 54b of the tether 54 are respectively sewed to the lower end portions of the upper cloth 50 that correspond to the vehicle-side wall 48 and the occupant-side wall 47, and the upper ends of the lower front cloth 51 and the lower rear cloth 52 are sewed together, as are the side edges and the lower edges of the lower front cloth 51 and the lower rear cloth 52. This completes the assembly of the air bag 46.

According to the first embodiment, a coupled portion 64 of the wrapping sheet 61 is sewed at a joint 47a where the rear end 54b of the tether 54 is connected to the occupant-side wall 47. And an engagement portion 62, which is to be fitted on the attachment shafts 31, 31, is formed at one end of the wrapping sheet 61 (in first embodiment, above a lower edge 61b adjacent to the lower edge 46b of the air bag 46 when opened flat). Further, a folding form control portion 66, which is also to be fitted on the attachment shafts 31, 31, is formed at the other end, extending upward from the coupled portion 64, of the wrapping sheet 61, i.e., below an upper edge 61a. Also, engagement holes 62a, 62a, into which the attachment shafts 31, 31 are inserted, are formed in the engagement portion 62. This structural arrangement ensures that when the air bag 46 has been folded, the folded shape can be maintained.

As for the folding form control portion 66, an auxiliary engagement portion (an auxiliary, attachment shaft engagement portion) 70, which engages the attachment shafts 31, is arranged along the upper edge 61a of the portion of the wrapping sheet 61 that extends upward from the coupled portion 64. And engagement holes 70a, 70a, into which the attachment shafts 31, 31 are inserted, are formed in the auxiliary portion 70.

Figure 6:
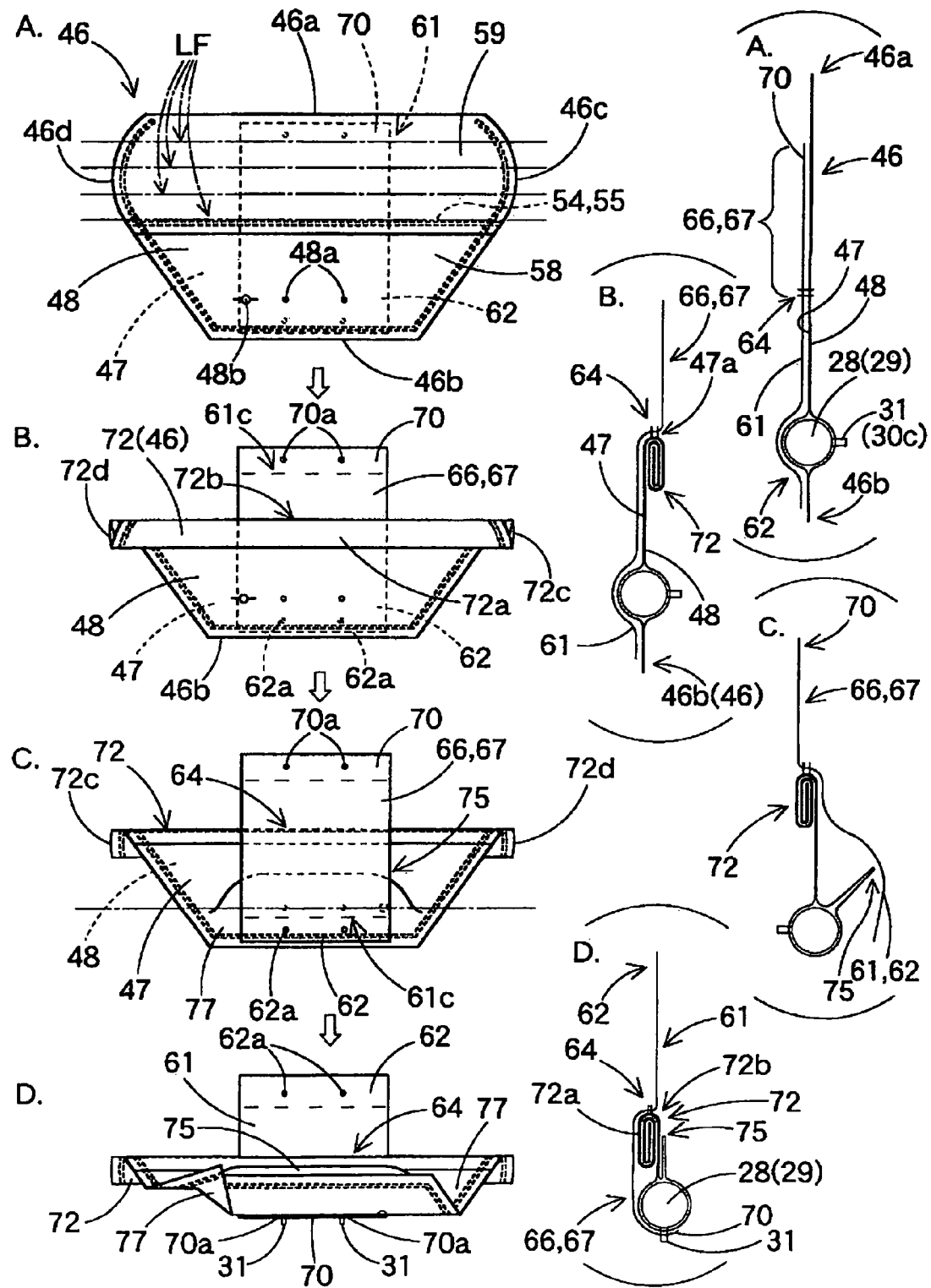
FIG. 6 is a diagram for explaining the air bag folding processing for the first embodiment.

In the first embodiment, when the auxiliary engagement portion 70 is fitted on the attachment shafts 31, the segment of the folding form control portion 66 that extends upward, from the coupled portion 64 to the auxiliary engagement portion 70, is employed as an auxiliary wrapping portion 67 that, as shown in FIGS. 6 (A to D), encloses a folded portion 72 of the air bag 46 that is being processed, and prevents the disarrangement of the shape of the folded portion 72.

In addition, in the first embodiment, the coupled portion 64 is located at the joint 47a where the occupant-side wall 47 is connected to the rear end 54b of the tether 54, which forms the partition wall 55. As shown in FIGS. 6 (A to D), when the downstream chamber 59 of the air bag 46 is folded the coupled portion 64 is located on the edge 72b (the rear edge when the air bag 46 is mounted in a vehicle) side of the end 72a (the upper end when the air bag 46 is mounted) of the outer wall of the folded portion 72 (see FIG. 2).

The wrapping sheet 61 of the first embodiment is made of a non-woven fabric, and when opened flat, has a vertically extended rectangular shape in which a plurality of rows of horizontal slits 61c are formed. The rows of horizontal slits 61c are provided so that when the enclosed air bag 46 is inflated, the vertically extended wrapping sheet 61 will be easily torn.

The processing for folding the air bag 46 will now be described. As shown in FIG. 6 (A), the inflator 28 is stored within the air bag 46, and the bolts 30c, which serve as the attachment shafts 31, project outward through the attachment holes 48a and one end of the main body 29 protrudes outward through the insertion hole 48b.

Following this, the lateral folding process is performed as shown in FIGS. 6 (A and B). That is, horizontal folds LF are formed to reduce the flattened, vertical size of an air bag 46 and produce the folded portion 72. In this embodiment, the portion nearest the upper edge 46a is folded toward the vehicle-side wall 48 in a manner whereby the upper edge 46a is moved nearer the lower edge 46b and the folded portion 72 is obtained. At this time, the folding will have been completed for the entire downstream chamber 59, i.e., the portion of the air bag 46 extending from the upper edge 46a to the coupled portion 64, so that the coupled portion 64, which is sewed at the joint 47a where the rear end 54b of the partition wall 55 is connected to the occupant-side wall 47, is located at the rear edge 72b of the upper end 72a on the outer wall side of the folded portion 72.

Sequentially, as shown in FIG. 6 (C), a convex fold 75 is formed so that the air bag 46, when stored in the main body 18 of the case 17, can obtain space in the area to the rear of the inflator 28. Thereafter, as shown in FIG. 6 (D), the attachment shafts 31 are inserted through the individual engagement holes 70a, and the auxiliary engagement portion 70 of the folding form control portion 66 is fitted on the attachment shafts 31. In this state, the folded portion 72 is pressed against the inflator 28, and is enclosed on one side by the auxiliary wrapping portion 67 of the folding form control portion 66. As a result, disarrangement of the folded shape is prevented.

Figure 7:
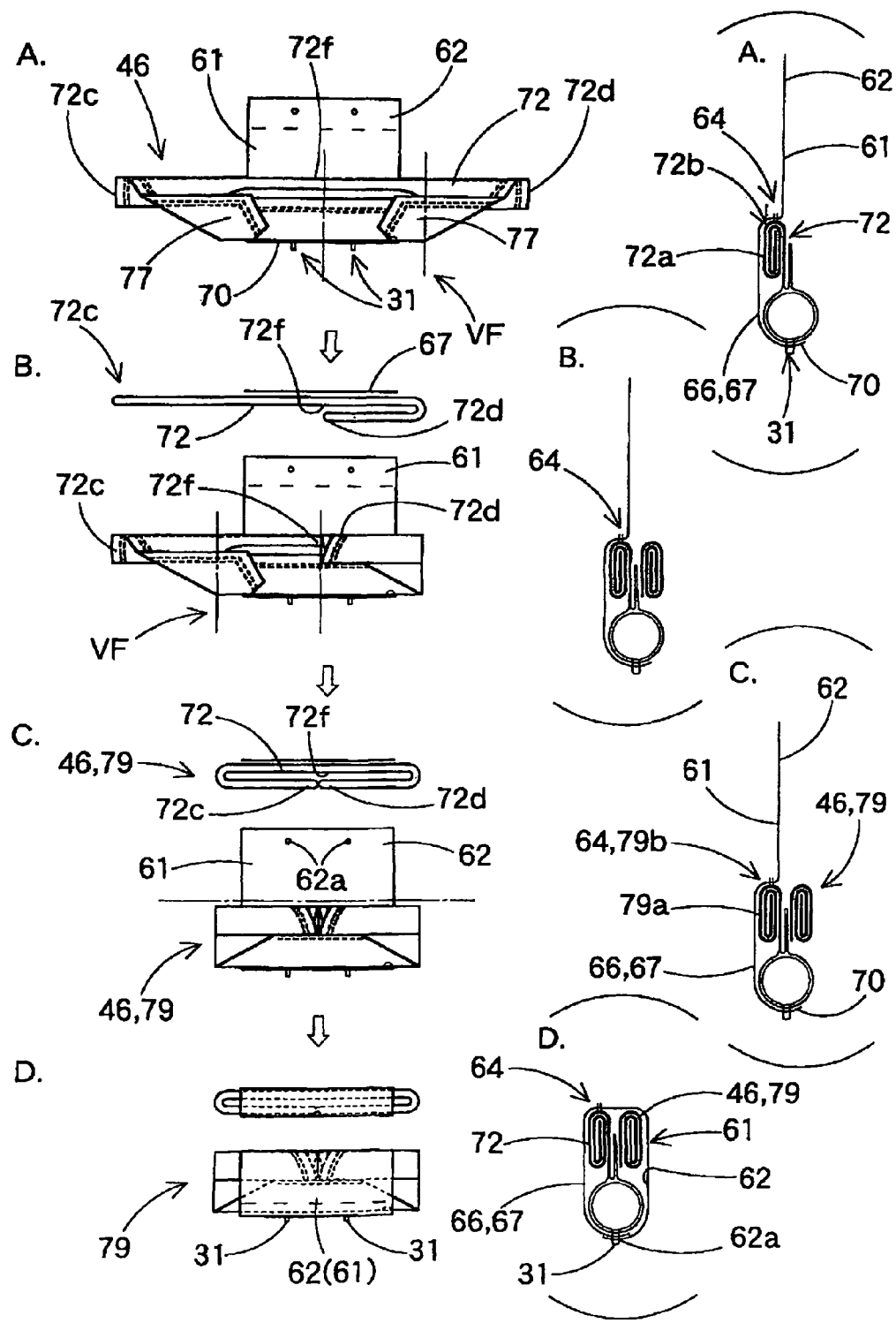
FIG. 7 is a diagram for explaining the air bag folding processing for the first embodiment, and showing the succeeding process for FIG. 6.

Furthermore, as shown in FIG. 6 (D) and FIG. 7 (A), extra portions 77 of the air bag 46, to the right and left of the inflator 28, are folded inward to facilitate the smooth storage of the inflator 28 and neighboring portions of the air bag 46 in the main body 18 of the case 17. Then, as shown in FIGS. 7 (B and C), the vertical folding process, for forming folds VF that extend from the front to the rear, is performed to reduce the horizontal size of the air bag 46. In this embodiment, the folded portion 72 is folded so that a left edge 72c and a right edge 72d meet along a center 72f of the folded portion 72, and a folding completed body 79, of the air bag 46, is obtained. Further, as shown in FIG. 7 (D), the engagement portion 62 is wrapped on around the folding completed body 79, and the engagement holes 62a are fitted on the attachment shafts 31. Then, since the wrapping sheet 61 has thereby wrapped the air bag 46, the shape of the folding completed body 79, of the air bag 46, will be maintained and will not be disarranged. In this embodiment, when the engagement holes 62a, of the engagement portion 62, have been fitted on the attachment shafts 31, the vertical (from the front to the rear) portion of the wrapping sheet 61 that extends, via the coupled portion 64, from the engagement holes 62a to the engagement holes 70a, encloses the folding completed body 79 in its entirety, from the front to the rear, and prevents the disarrangement of the shape of the air bag 46.

After the air bag 46 has been folded and secured in this manner, the inflator 28 and the folded air bag 46 are mounted in the main body 18 of the case 17. During this mounting procedure, the connector 33 side end of the main body 29, of the inflator 28, is fitted in and passed through the insertion hole 18e, and the bolts 30c, on the inflator 28, are inserted into and through the attachment holes 18d. Thus, after the nuts 32 have been fitted on the bolts 30c and tightened, the inflator 28 and the air bag 46 are mounted securely in the main body 18 of the case 17.

Thereafter, to assemble the air bag cover 21 with the case 17, the hooks 18b and 18c of the main body 18, of the case 17, are inserted into and engage the engagement holes 25a and 26a in the contiguous walls 25 and 26. Subsequently, the outer edge of the panel portion 19 of the case 17 is fixed to the body 1, using the brackets 4, 5, 6 and 7, and the connector 33, to which the lead line 34 is attached, is connected to the main body 29 of the inflator 28. By proceeding in this manner, and finally attaching the instrument panel 14 and a lower cover 15 (see FIGS. 1 and 2), the mounting of the knee protection air bag system S on a vehicle can be completed.

When the air bag system S for knee protection has been mounted in a vehicle, and an operating signal is transmitted, via the lead line 34, to the main body 29 of the inflator 28, inflation gas is discharged from the gas discharge ports 29a of the inflator 28. The inflation gas passes through the gas outlets 30b of the defuser 30 and enters the air bag 46, which expands, while being inflated, and tears the wrapping sheet 61, breaks the thin portion 22, and forces the doors 23, 23 of the air bag cover 21 open vertically. Then, as indicated by dashed double-dotted line in FIGS. 1 and 4, the air bag is opened fully to protect the knees K of the driver MD.

According to this embodiment, during the process for folding an air bag 46 to provide the folded portion 72, the folding form control portion 66 of the wrapping sheet 61 is employed. Therefore, since the auxiliary engagement portion 70 can be fitted on the attachment shafts 31 by pulling the coupled portion 64, the shape of each air bag 46 that is folded can be stably controlled. Thus, for the air bags 46, variances in the succeeding folding process are also prevented, and appropriate folding completed shapes are consistently obtained. Further, when the folding process has been completed, the engagement portion 62 need only be fitted on the attachment shafts 31 for the air bag 46 to be stored in the main body 18 of the case 17 where the folded shape can be maintained. Furthermore, in the folded state, each air bag 46 that has been folded can be smoothly and fully inflated.

Moreover, the folding form control portion 66 of this embodiment is not provided as a separate member, but is integrally formed with the wrapping sheet 61. That is, the wrapping sheet 61 that prevents the disarrangement of the shape of a folded air bag 46, i.e., maintains the folding completed shape, can be easily employed during the folding process and can subsequently control the shape of the folded air bag 46. Of course, since the folding form control portion 66 need only include a function for maintaining a predetermined shape for an air bag 46 that is being processed, the function for maintaining the folding completed shape of the air bag 46 can be provided without affecting the ease with which the wrapping sheet 61 and the folding form control portion 66 are torn when the air bag 46 is inflated.

Therefore, with the wrapping sheet 61 of the first embodiment, the form of an air bag 46, while being folded, can be controlled, and the airbag 46 can be easily and stably folded to provide a folding completed shape. Furthermore, the air bag 46 can be safely stored in the main body 18 of the case 17 while the folding completed shape is maintained.

Furthermore, for the first embodiment, a plurality of folding steps, including lateral folding steps and a vertical folding step, are performed to fold an air bag 46 from a flat, opened state, while the manner in which the folding is performed varies so that when the final lateral folding step preceding the last vertical folding step has been completed, the coupled portion 64 is positioned on the outer wall of the folded portion 72 of the air bag 46. Therefore, when the coupled portion 64 has been positioned on the outer wall of the folded portion 72 of the air bag 46, the folding form control portion 66 is positioned to enable the fitting of the auxiliary engagement portion 70 on the attachment shafts 31. In addition, when the auxiliary engagement portion 70 has been fitted on the attachment shafts 31, the segment of the folding form control portion 66 extending from the coupled portion to the auxiliary engagement portion 70 is positioned for employment as the auxiliary wrapping portion 67, which wraps the folded portion 72 and prevents the disarrangement of its shape.

With this arrangement, when the auxiliary engagement portion 70 has been fitted on the attachment shafts 31, the folded portion 72 of an air bag 46 that is being processed is wrapped by the auxiliary wrapping portion 67 and disarrangement of its shape is prevented. Therefore, the succeeding folding step (the vertical folding step) can be performed correctly for the air bag 46 while its shape is maintained, and a compactly formed, folding completed shape for the air bag 46 can be easily and appropriately obtained.

In addition, in the first embodiment, when the auxiliary engagement portion 70 is fitted on the attachment shafts 31, the coupled portion 64 of the wrapping sheet 61 is positioned adjacent to the locations of the upper end 72a and the rear edge 72b that, during the lateral folding process, respectively become the end and the edge of the folded portion 72. Further, when the folding completed body 79 of the air bag 46 is obtained at the vertical folding step, and the engagement portion 62 has been fitted on the attachment shafts 31, the coupled portion 64 is positioned near or at the locations of an upper end 79a and a rear end 79b of the folding completed body 79 (see FIGS. 2 and 7 (D)).

Therefore, so long as the coupled portion 64 is located near or at the upper end 72a and the rear edge 72b of the folded portion 72 of an air bag 46 that is being processed, it can easily be perceived that the folding process has been appropriately performed and that the air bag 46 being folded has a predetermined width and shape. In addition, upon the completion of the processing, so long as the coupled portion 64 is located at the upper end 79a and the rear edge 79b of the folding completed body 79 of the air bag 46, it can easily be seen that the entire air bag 46 has been appropriately folded, without the folded portion 72 being disarranged.

According to the first embodiment, the coupling of the coupled portion 64 occurs at the joint 47a, where the partition wall 55, provided to divide the air bag 46 and to thereby define the upstream chamber 58 and the downstream chamber 59, is connected to the occupant-side wall 47. Further, the joint 47a, which is located at the coupling position of the coupled portion 64, is arranged along the edge (the rear edge) 72b of the end (the upper end) 72a of the folded portion 72, which is produced when the downstream chamber 59 is folded. Thus, the joint 47a is arranged along the edge (the rear edge) 79b of the end (the upper end) 79a of the folding completed body 79a when the folding process for the air bag 46 has been completed.

Moreover, according to this embodiment, when inflation gas G is released to flow into the air bag 46, first, the inflation of the upstream chamber 58 is begun, and by the time this inflation of the upstream chamber 58 is nearly completed, the partition wall 55 has been horizontally projected outward from the main body 18 of the case 17. Then, inflation gas G passes through the gas guide holes 56 formed in the partition wall 55, flowing outward along the left and right edges 46c and 46d of the air bag 46. As a result, the downstream chamber 59 is expanded to the sides and to the upper edge 46a, and then in the direction of its thickness, until the air bag 46 is fully inflated (see FIG. 5 (A)).

Therefore, so long as the coupled portion 64 is located at the joint 47a, where the partition wall 55 that defines the upstream and the downstream chambers 58 and 59 is connected to the occupant-side wall 47, and along the edge (the rear edge) 72b of the end (the upper end) 72a of the folded portion 72 that is produced by folding the downstream chamber 59, the partition wall 55 can be accurately positioned and aligned by employing the folding form control portion 66. As a result, an inflation process that continues until upstream chambers 58 are fully inflated; a positioning accuracy and an axial direction that seldom differs, for the partition wall 55 and the gas guide holes 56, respectively, when air bags 46 are inflated and a stable expansion movement can be provided for air bags 46. Therefore, according to the knee protection air bag system S of the first embodiment, during the process for supplying inflation gas G to inflate an air bag 46, first, the upstream chamber 58 is inflated and expanded, its shape developed to the sides. Sequentially, thereafter, the inflation gas G flows through the gas guide holes 56, 56 formed on either side of the upstream chamber 58 into the downstream chamber 59, which is inflated and expanded to the sides and to the upper edge 46a of the air bag 46. Following this, the downstream chamber 59 is further expanded to increase its thickness. In this manner, the air bag 46 can be fully expanded and pressed against a driver's MD knees K near an interior vehicular member, such as the column cover 13, so that the downstream chamber 59 can be smoothly inserted, under pressure, into a narrow gap between the knees K and the vehicular member, forcing them apart and protecting the knees K by reducing and absorbing transmitted impact shock.

Figure 8:
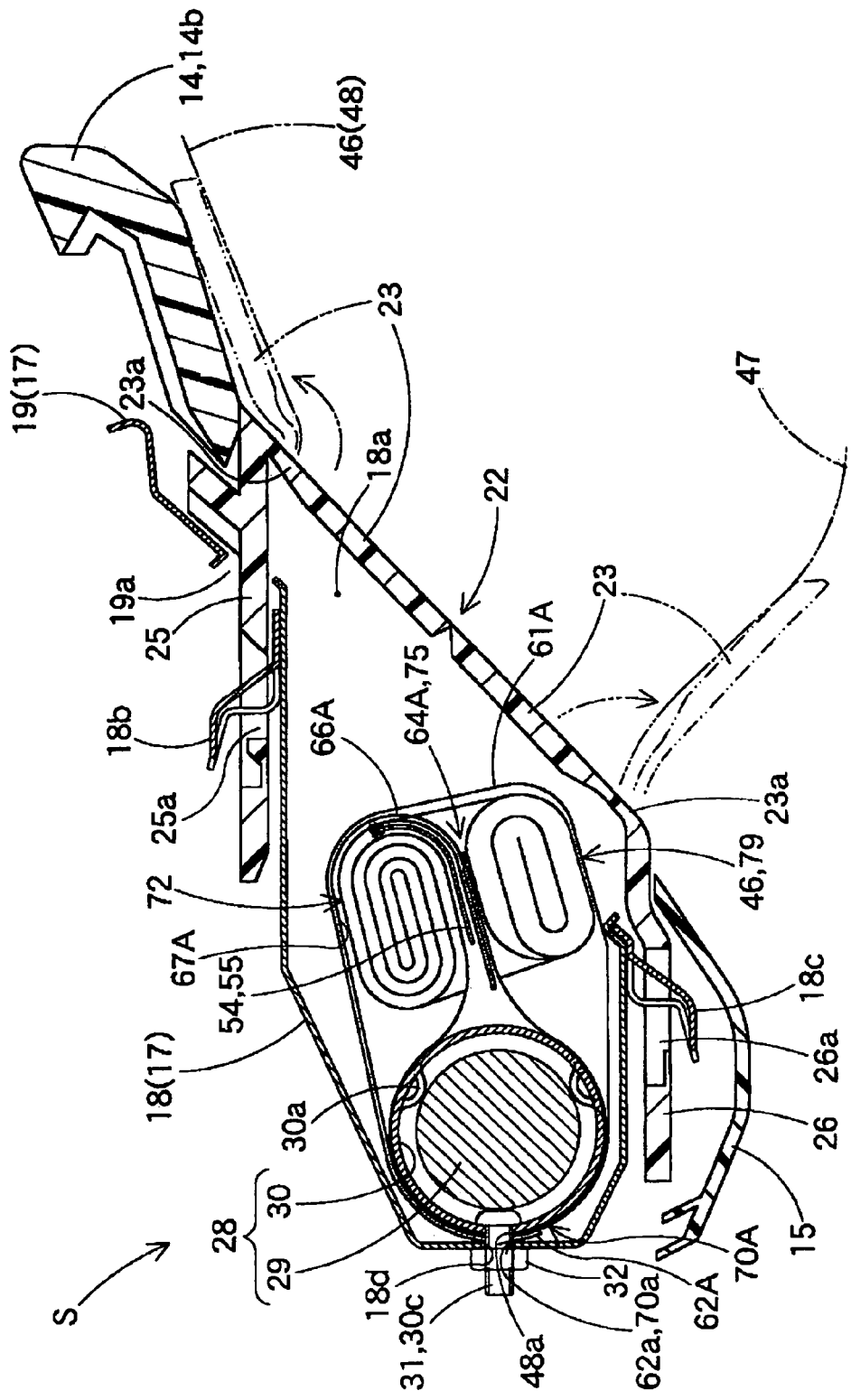
FIG. 8 is a schematic vertical cross-sectional view of a knee protection air bag system that includes an air bag enclosed by a wrapping sheet according to a second embodiment of the present invention, showing the state in a longitudinal direction of a vehicle on which the air bag system is mounted.

In the first embodiment, the coupled portion 64 of the wrapping sheet 61 has been sewed at the joint 47a, where the occupant-side wall 47 is connected to the rear end 54b of the tether 54 that constitutes the partition wall 55. However, just as may a wrapping sheet 61A shown in FIGS. 8 to 10 for a second embodiment, a coupled portion 64A may be provided at the location of a convex fold 75 in an air bag 46.

Figure 9:
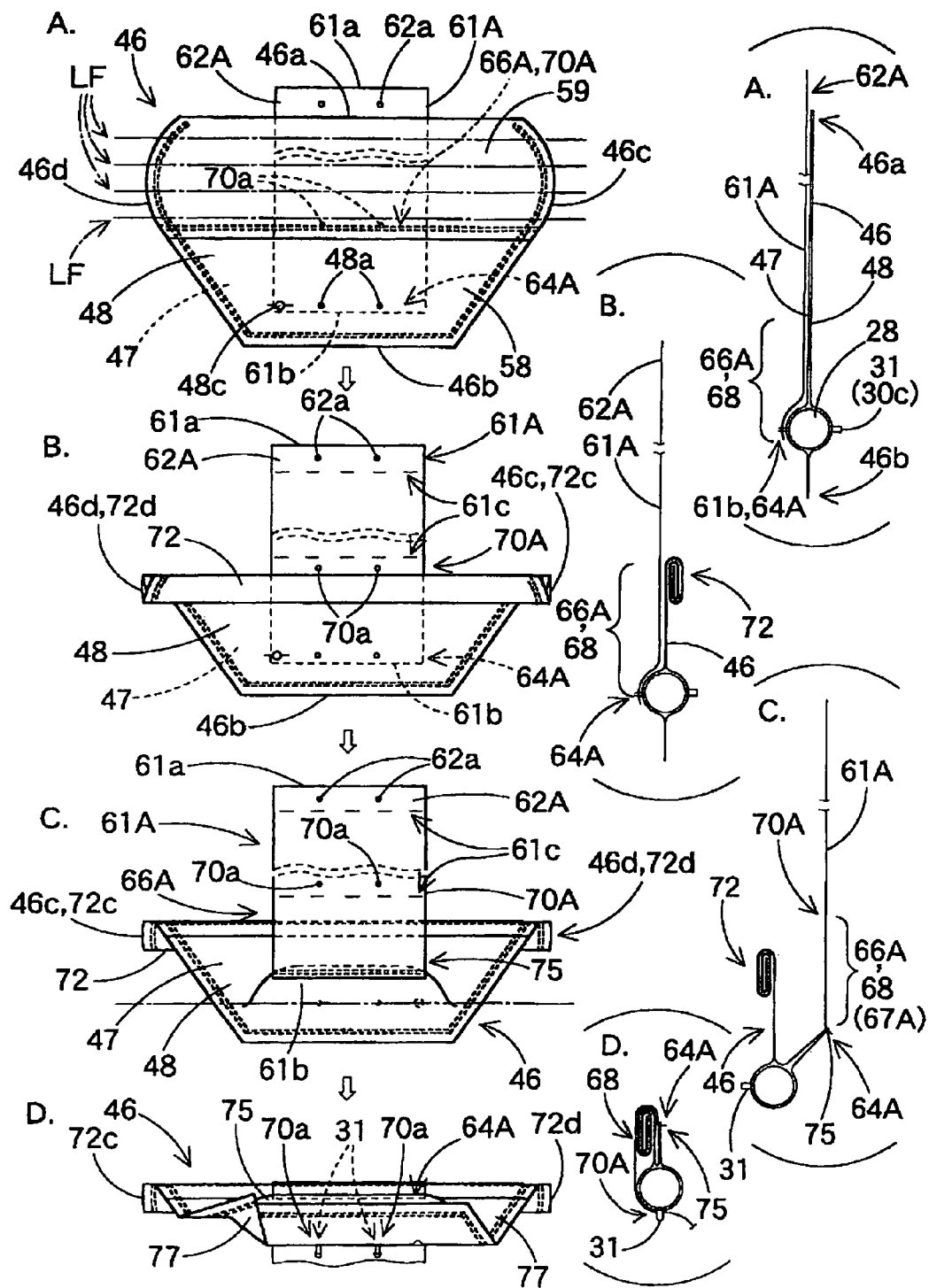
FIG. 9 is a diagram for explaining the air bag folding processing for the second embodiment.
Figure 10:
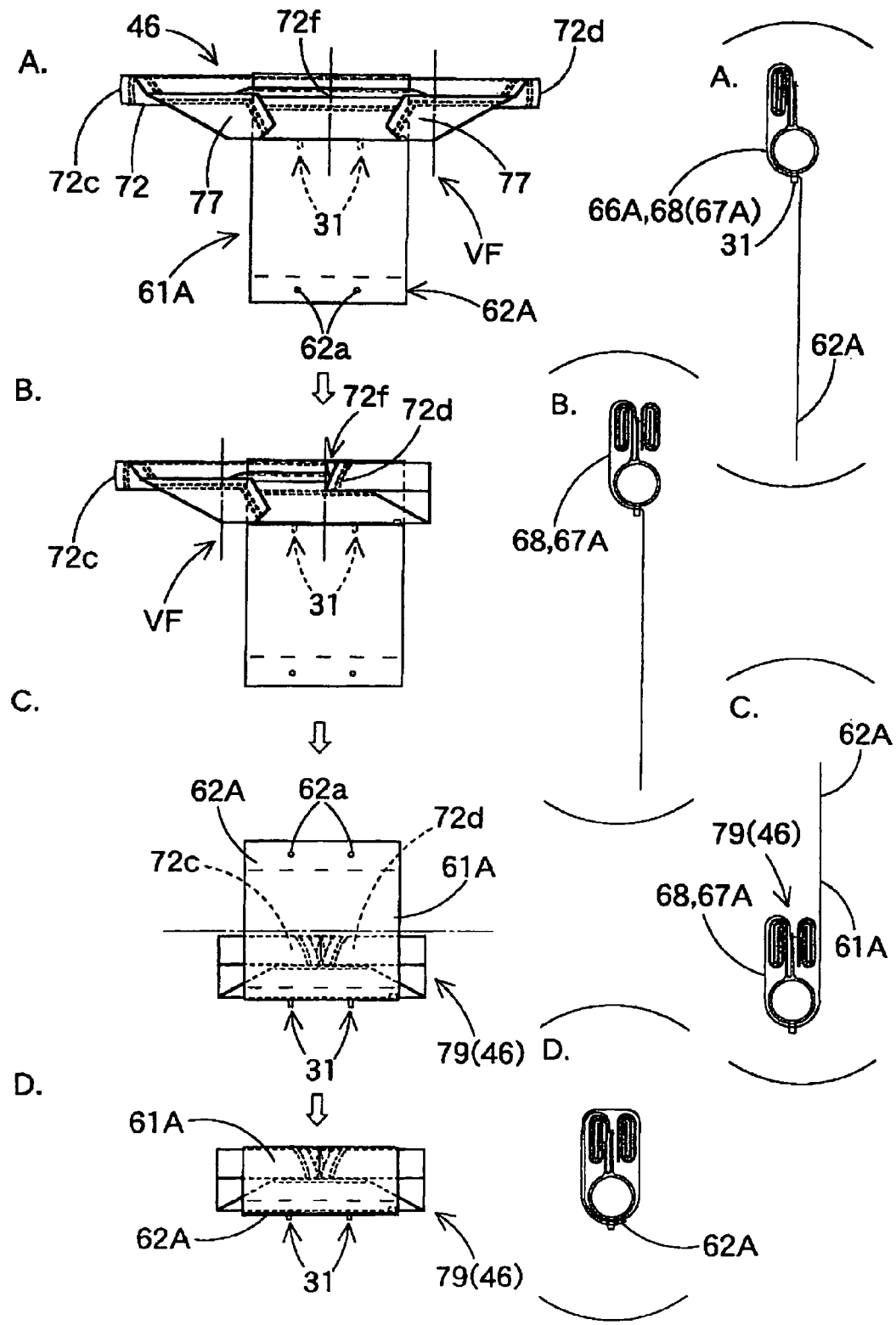
FIG. 10 is a diagram for explaining the air bag folding processing for the second embodiment, and showing the succeeding process for FIG. 9.

This wrapping sheet 61A is formed as follows. As shown in FIG. 9 (A), the coupled portion 64A is formed by sewing a lower edge 61b at the location of the convex fold 75. Further, a segment extending upward from the coupled portion 64A to an auxiliary engagement portion 70A, which is used for attachment shafts 31, is defined as a folding form control portion 66A, which is also employed as a fold setting portion 68. Furthermore, the side near an upper edge 61a is employed as an engagement portion 62A that encloses a folding completed body 79 of the air bag 46 and that is to be fitted on the attachment shafts 31.

In the second embodiment as well as in the first embodiment, the wrapping sheet 61A is formed of non-woven fabric, and has a vertically long rectangular shape in the flat open state. And lateral slits 61c are formed in a plurality of rows, so that when the enclosed air bag 46 is inflated, the wrapping sheet 61A is easily torn vertically (see FIGS. 9 (B and C)).

The processing for folding the air bag 46 using the wrapping sheet 61A will now be described. As shown in FIG. 9A, the inflator 28 is stored within the air bag 46, and bolts 30c, which serve as attachment shafts 31, project outward through attachment holes 48a and one end of a main body 29 protrudes outward through an insertion hole 48b.

Following this, the lateral folding process is performed as shown in FIGS. 9 (A and B). That is., horizontal folds LF are formed to reduce the flattened, vertical size of the air bag 46 and produce a folded portion 72. In second embodiment as well as in the first embodiment, the portion nearest an upper edge 46a is folded toward a vehicle-side wall 48 in a manner whereby the upper edge 46a is moved nearer a lower edge 46b and the folded portion 72 is obtained. At this time, as well as in the first embodiment, the folding will have been completed for an entire downstream chamber 59.

Following this, as shown in FIG. 9(C), the folding form control portion 66A is pulled (actually, the engagement portion 26A on the upper edge 61a side is pulled) to form the convex fold 75, so that a space near the rear of the inflator 28 can be provided for the air bag 46. Then, as shown in FIG. 9D, the auxiliary engagement portions 70A of the folding form control portion 66A are fitted on the attachment shafts 31 by being inserted into engagement holes 70a. In this state, the folding form control portion 66A, which extends from the coupled portion 64A to the auxiliary engagement portion 70A, serves as the fold setting portion 68, and forms the fold 75 by being pulled. At the same time, in the area from the coupled portion 64A to the auxiliary engagement portion 70A, a folded portion 72 is pressed against the inflator 28, and enclosed to prevent the shape of the folded portion from being deteriorated. That is, in a second embodiment, the folding form control portion 66A extending from the coupled portion 64A to the auxiliary engagement portion 70A serves as the fold setting portion 68, and also as an auxiliary wrapping portion 67A that encloses the folded portion 72 and prevents deterioration of the shape.

Furthermore, as shown in FIGS. 9D and 10A, extra portions 77 of the air bag 46, to the right and left of the inflator 28, are folded inward. Then, as shown in FIGS. 10B and 10C, the vertical folding process, for forming folds VF that extend from the front to the rear, is performed to reduce the horizontal size of the air bag 46. In the second embodiment, as well as in the first embodiment, the folded portion 72 is folded so that a left edge 72c and a right edge 72d meet along a center 72f of the folded portion 72, and a folding completed body 79, of the air bag 46, is obtained. Further, as shown in FIG. 10(D), the engagement portion 62A of the wrapping sheet 61A is fitted to the attachment shafts, and the engagement holes 62a are fitted on the attachment shafts 31. Then, since the wrapping sheet 61A has thereby wrapped the air bag 46, the shape of the folding completed body 79, of the air bag 46, will be maintained and will not be disarranged. In the second embodiment, when the engagement portion 62A, has been fitted on the attachment shafts 31, the vertical (from the front to the rear) portion of the wrapping sheet 61A, which extends from the engagement holes 70a of the auxiliary engagement portion 70A to the engagement holes 62a of the engagement portion 62A, encloses the folding completed body 79 in its entirety, from the front to the rear, and prevents the disarrangement of the shape of the air bag 46.

As well as in the first embodiment, the air bag 46, which has been folded, is mounted on a vehicle. At the time of the operation of a knee protection air bag system S, the wrapping sheet 61A is smoothly torn in consonance with the inflation of the air bag 46, and ejects and expands the air bag 46 from a main body 18 of a case 17.

According to the wrapping sheet 61A of the second embodiment, during the process for folding the air bag 46, the attachment shafts 31 need only be fitted on the auxiliary engagement portion 70A of the folding form control portion 66A that serves as the fold setting portion 68. Then, the convex fold 75 of the air bag 46 can be easily and stably formed at a predetermined position where the coupled portion 64A is located. Therefore, a folding completed shape for the air bag 46 can be obtained easily and steadily, and the folding process can be rapidly performed. Furthermore, since the convex fold 75 of the air bag 46 can be formed at a predetermined position, a smooth expansion movement can be more constantly provided for air bags 46.

For the second embodiment, the fold setting portion 68 of the wrapping sheet 61A is employed in order to accurately form, in the upstream chamber 58, the fold 75, which is used to provide space near the rear side of the inflator 28. When inflation gas G is ejected from the inflator 28 the process beginning with the start of the inflation of the upstream chamber 58 and continuing until its completion, can be quickly performed, and the succeeding inflation of the downstream chamber 59 can also be rapidly performed.

Figure 11:
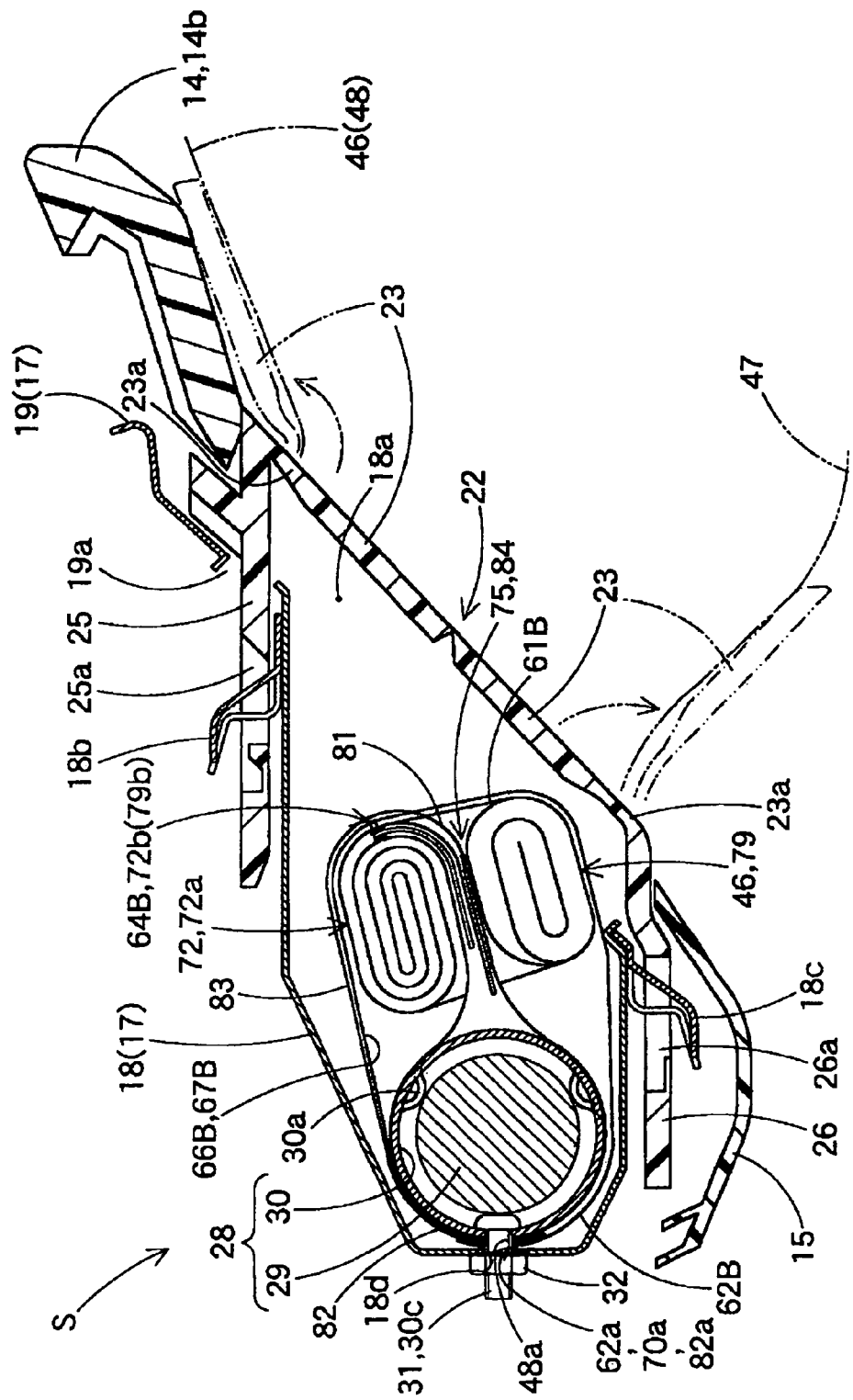
FIG. 11 is a schematic vertical cross-sectional view of a knee protection air bag system that includes an air bag enclosed by a wrapping sheet according to a third embodiment of the present invention, showing the state in a longitudinal direction of a vehicle on which the air bag system is mounted.
Figure 12:
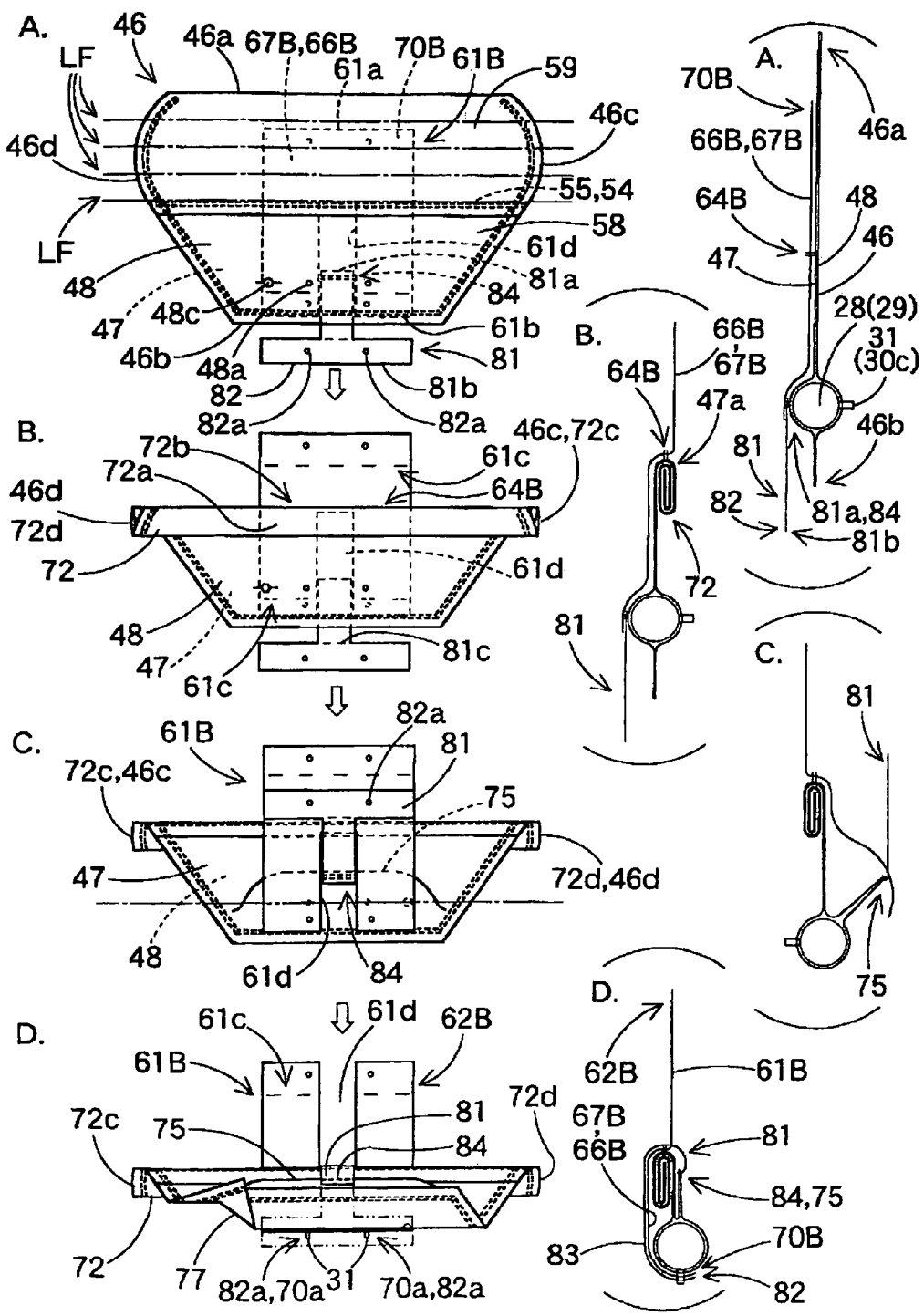
FIG. 12 is a diagram for explaining the air bag folding processing for the third embodiment.
Figure 13:
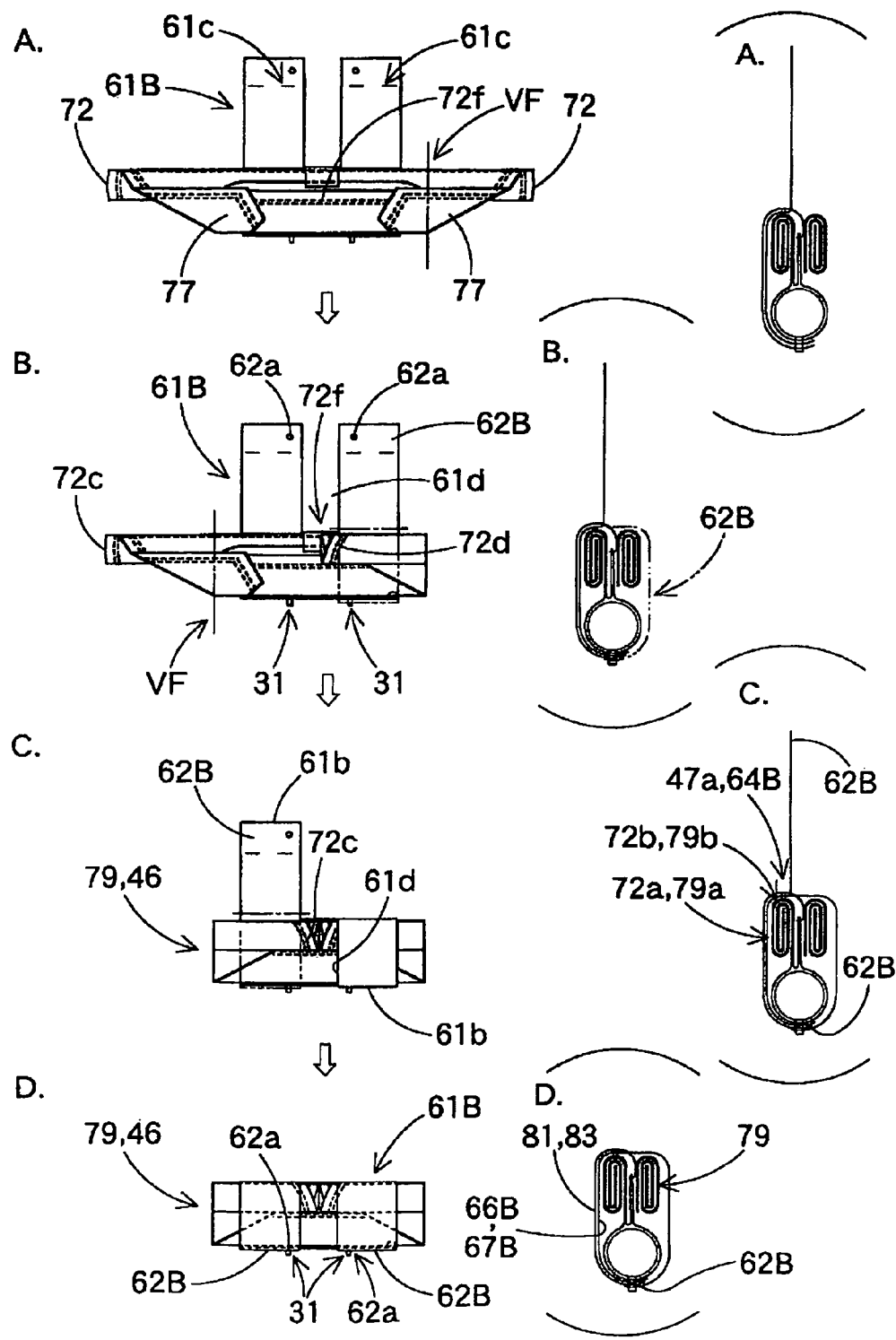
FIG. 13 is a diagram for explaining the air bag folding processing for the third embodiment, and showing the succeeding process for FIG. 12.

In a third embodiment, as shown in FIGS. 11 to 13, two wrapping sheets 61B and 81 are used to wrap an air bag 46, and a convex fold 75 can be smoothly formed for the air bag 46. However, the only way in which the wrapping sheet 61B differs from the wrapping sheet 61 of the first embodiment is that, as shown in FIG. 12A, the wrapping sheet 61B of the third embodiment is partially cut, upward from the center of a lower edge 61*b*, to provide a notch 61*d* that prevents interference with the wrapping sheet 81. As for the remainder of its structure, the wrapping sheet 61B is formed in the same manner as is the wrapping sheet 61 in the first embodiment. That is, the wrapping sheet 61B includes: an engagement portion 62B, a coupled portion 64B and a folding form control portion 66B, which serves as an auxiliary wrapping portion 67B and has an auxiliary engagement portion 70B used for attachment shafts 31, that respectively correspond to the engagement portion 62, the coupled portion 64 and the folding form control portion 66, which serves as the auxiliary wrapping portion 67 and has the auxiliary attachment shaft engagement portion 70, in the first embodiment. The wrapping sheet 61B also has a rectangular shape.

The wrapping sheet 81 has an inverted T shape, as shown in FIG. 12 (A), and a coupled portion 84, which is to be connected to the convex fold 75 of the air bag 46, is arranged along the upper edge 81*a*. Further, an auxiliary engagement portion 82, in which engagement holes 82*a* are formed into which the attachment shafts 31, 31 are inserted, is positioned along a lower edge 81*b*. When the convex fold 75 is pulled, during the process for folding the air bag 46, the auxiliary engagement portion 82 of the wrapping sheet 81 is fitted on the attachment shafts 31, and the area from the coupled portion 84 to the auxiliary engagement portion 82 is employed as a fold setting portion 83, for forming the convex fold 75 (see FIG. 12 (D)).

As in the above embodiments, the wrapping sheets 61B and 81 are formed of non-woven fabric, and slits 61*c* and 81*c* are appropriately formed in the horizontal direction, so that when the enclosed air bag 46 is inflated, the wrapping sheets 61B and 81 are easily torn vertically (see FIG. 12 (B)).

The processing for folding the air bag 46 using the wrapping sheets 61B and 81 of the third embodiment will now be described. As shown in FIG. 12A, the inflator 28 is stored within the air bag 46, and bolts 30*c*, which serve as the attachment shafts 31, project outward through attachment holes 48*a* and one end of a main body 29 protrudes outward through insertion hole 48*b*.

Following this, the lateral folding process is performed as shown in FIGS. 12 (A and B). That is, horizontal folds LF are formed to reduce the flattened, vertical size of an air bag 46 and produce a folded portion 72. In this embodiment, the portion nearest an upper edge 46*a* is folded toward a vehicle-side wall 48 in a manner whereby the upper edge 46*a* is moved nearer a lower edge 46*b* and the folded portion 72 is obtained. At this time, the folding will have been completed for an entire downstream chamber 59, i.e., the portion of the air bag 46 extending from the upper edge 46*a* to the coupled portion 64, so that a coupled portion 64B is located at a rear edge 72*b* of an upper end 72*a* on the outer wall side of the folded portion 72.

Sequentially, as shown in FIGS. 12 (C and D), the auxiliary engagement portion 70B of the folding form control portion 66B is fitted on the attachment shafts 31 by inserting the attachment shafts 31 through the engagement holes 70*a*. Further, the attachment shafts 31 are inserted through the engagement holes 82*a* while the wrapping sheet 81 is being pulled, and the auxiliary engagement portion 82 is fitted on the attachment shafts 31. Through this process, the fold setting portion 83 of the wrapping sheet 81 forms the convex fold 75 at the air bag 46 location whereat the coupled portion 84 is connected. In addition, a folded portion 72 is pressed toward the inflator 28 and is enclosed by the auxiliary wrapping portion 67B of the folding form control portion 66B. As a result, deterioration of the shape can be prevented.

Furthermore, as shown in FIGS. 12 (D) and 13 (A), extra portions 77 of the air bag 46, to the right and left of the inflator 28, are folded inward, and as shown in FIGS. 13B and 13C, the vertical folding process is performed to reduce the horizontal size of the air bag 46. In this embodiment, the folded portion 72 is folded so that a left edge 72*c* and a right edge 72*d* meet along a center 72*f* of the folded portion 72, and a folding completed body 79, of the air bag 46, is obtained. Further, as shown in FIG. 13 (D), the engagement portion 62B of the wrapping sheet 61B is fitted to the attachment shafts 31, and the engagement holes 62*a* are fitted on the attachment shafts 31. Then, since the wrapping sheet 61B has thereby wrapped the air bag 46, the shape of the folding completed body 79, of the air bag 46, will be maintained and will not be disarranged.

As well as in the first embodiment, the air bag 46, which has been folded, is mounted on a vehicle. At the time of the operation of a knee protection air bag system S, the wrapping sheet 61B or 81 is smoothly torn in consonance with the inflation of the air bag 46, and ejects and expands the air bag 46 from a main body 18 of a case 17.

Through the processing performed to fold the air bag 46 using the wrapping sheets 61A and 81 of the third embodiment, the convex fold 75 can be formed more quickly and steadily than in the first embodiment.

Figure 14:
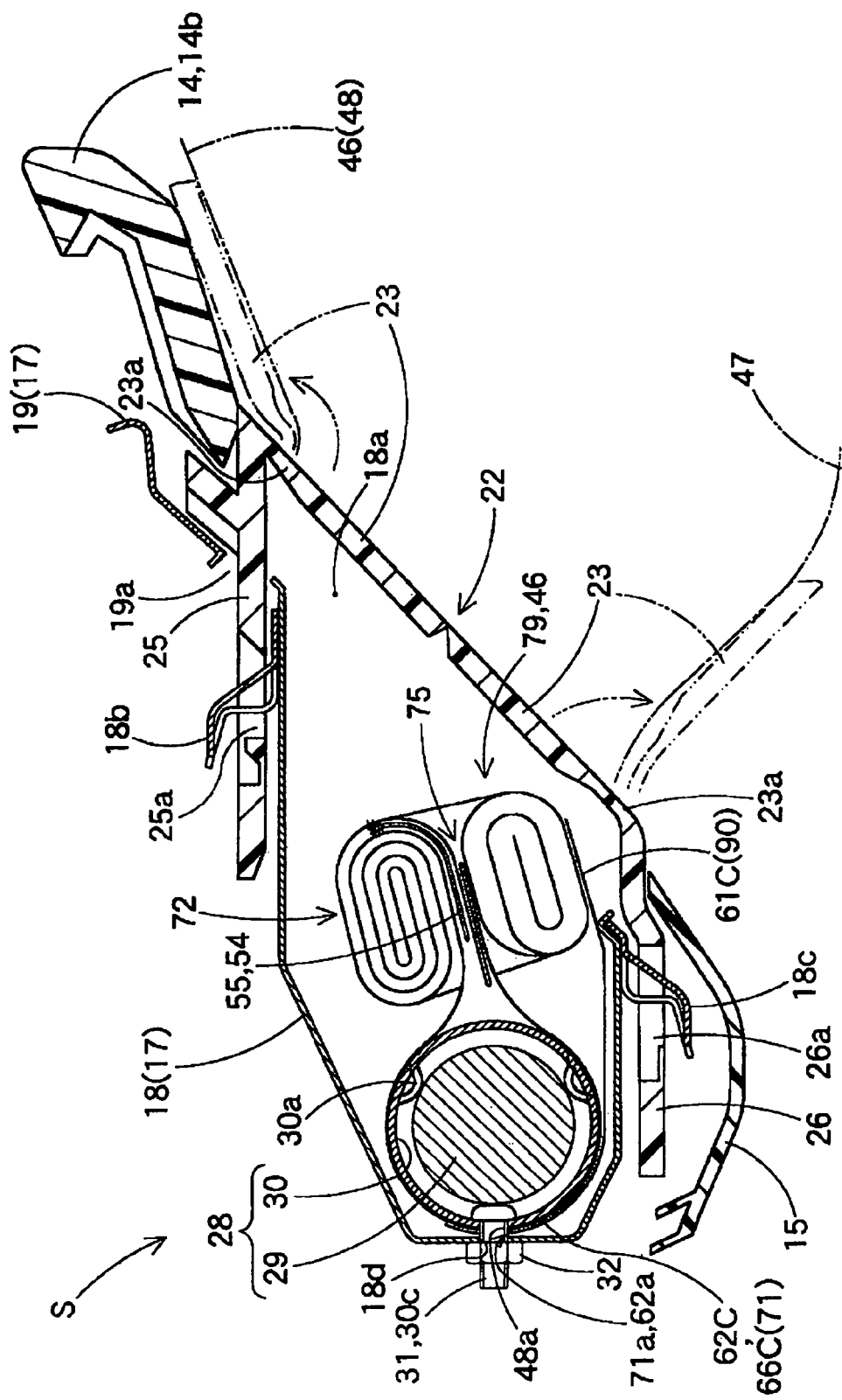
FIG. 14 is a schematic vertical cross-sectional view of a knee protection air bag system that includes an air bag enclosed by a wrapping sheet according to a fourth embodiment of the present invention, showing the state in a longitudinal direction of a vehicle on which the air bag system is mounted.
Figure 15:
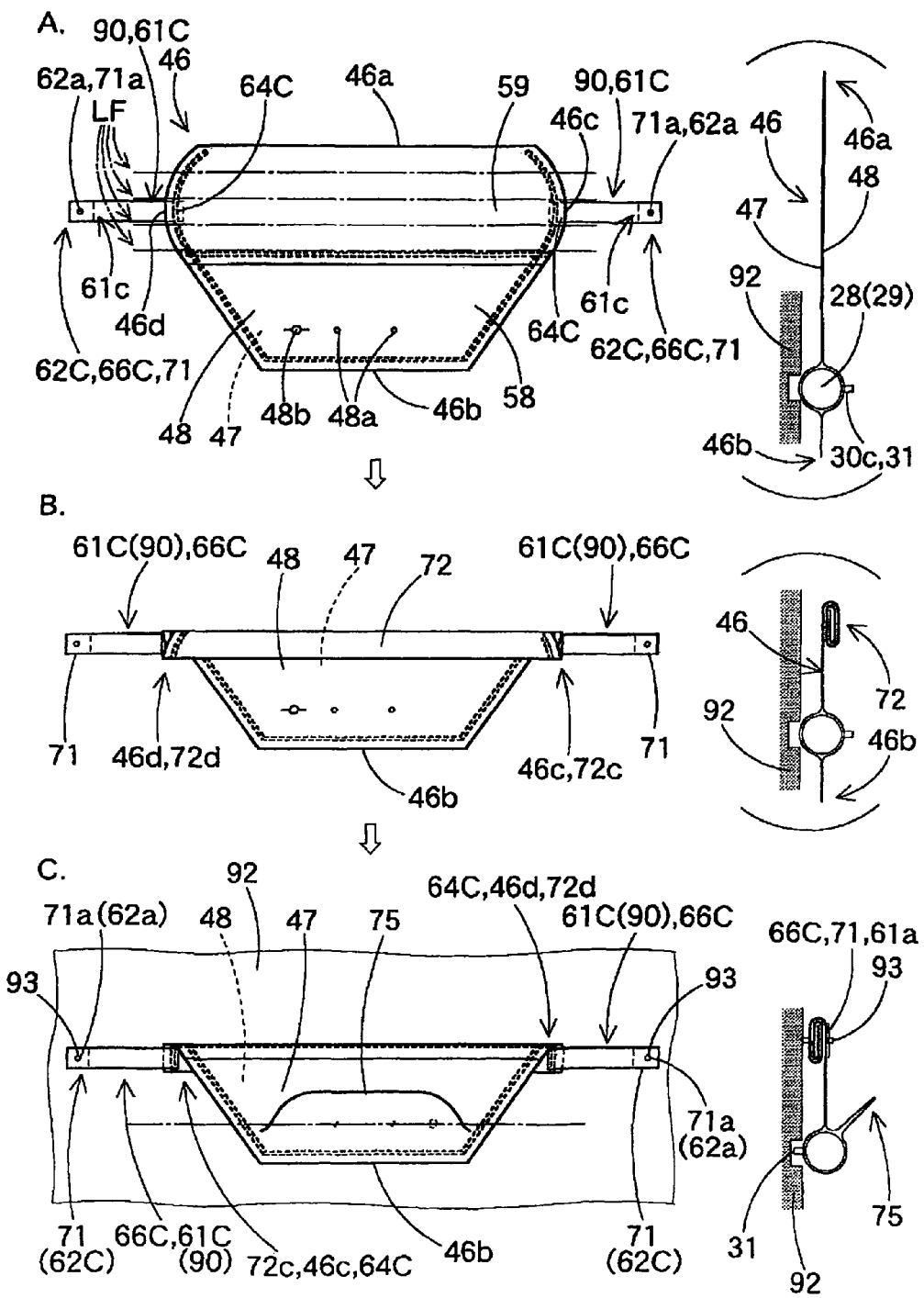
FIG. 15 is a diagram for explaining the air bag folding processing for the fourth embodiment.
Figure 16:
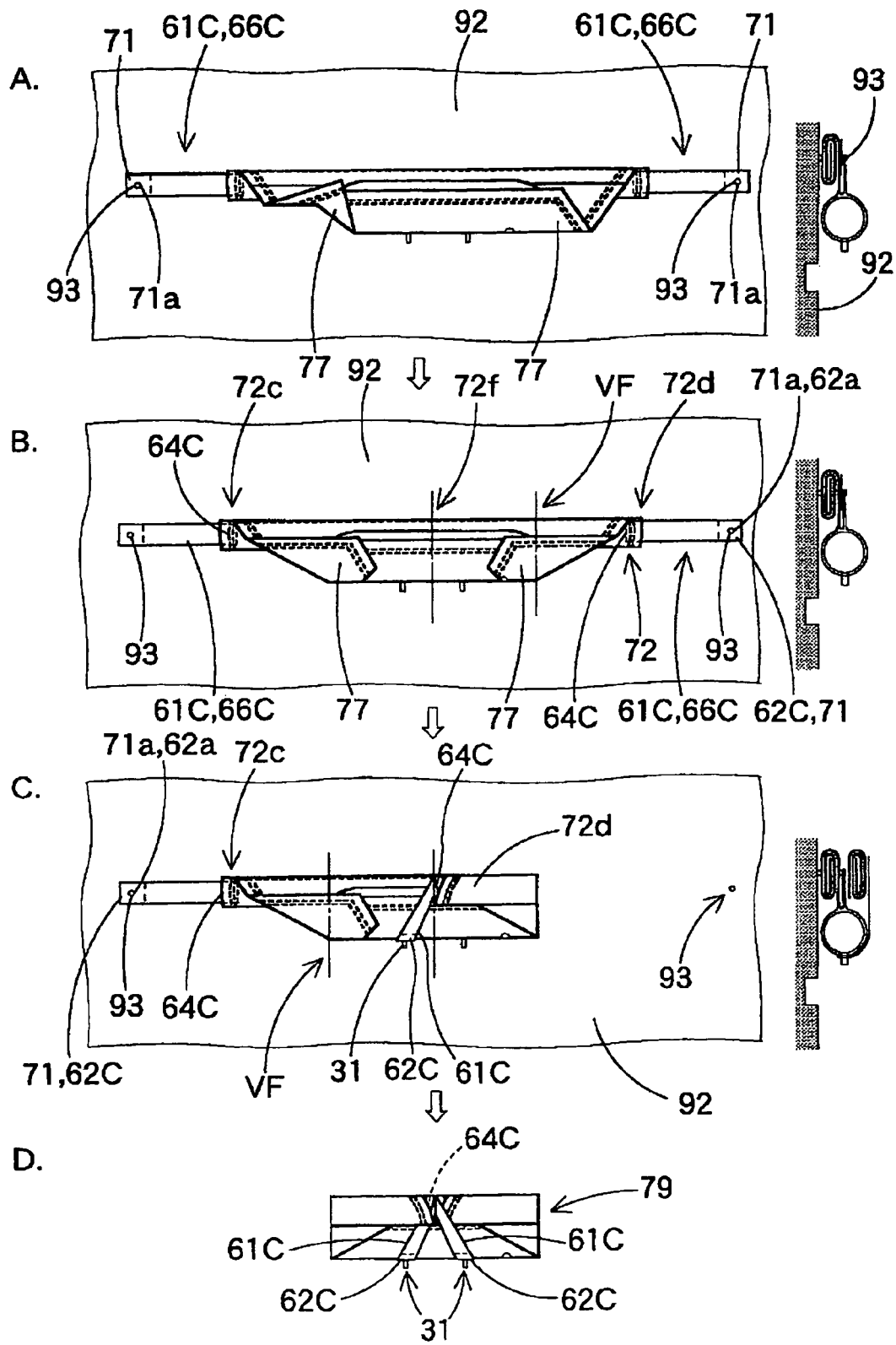
FIG. 16 is a diagram for explaining the air bag folding processing for the fourth embodiment, and showing the succeeding process for FIG. 15.

Two wrapping sheets 61C, shown in FIGS. 14 to 16, for a fourth embodiment may be employed to fold an airbag 46. These two wrapping sheets 61C of the fourth embodiment are belt segments 90, 90 made of non-woven fabric (see FIG. 15 (A)).

For the wrapping sheets 61C formed of the belt segments 90, as shown in FIG. 15 (A), coupled portions 64C are connected respectively to a left edge 46*c* and a right edge 46*d* of the air bag 46. More specifically, the coupled portions 64C are sewed to an occupant-side wall 47 and a vehicle-side wall 48 at horizontally outmost positions along the left edge 72c and the right edge 72d, within the width of the folded portion 72 of the air bag 46.

Engagement portions 62C, in which engagement holes 62a are formed into which attachment shafts 31 are inserted, are provided at the distal ends of the wrapping sheets 61C, separate from the coupled portions 64C. When folding of the air bag 46 has been completed, the engagement portions 62C are fitted on the attachment shafts 31 to cross the wrapping sheets 61C over each other, so that a folding completed body 79 of the air bag 46 can be enclosed, and disarrangement of the shape of the folded air bag 46 can be prevented (see FIGS. 16 (C and D)). It should be noted that slits 61c are latitudinally formed in the wrapping sheets 61C, so that when the air bag 46 is inflated the wrapping sheets 61C can be smoothly torn.

In addition, for each wrapping sheet 61C as shown in FIG. 15C, during the processing for folding the air bag 46, pin-like jigs 93, prepared on a work table 92, are inserted into the engagement holes 62a and hold the engagement portions 62C. The positioning of the jigs 93 on the work table 92 should be appropriately determined. Assume that the folded portion 72 is placed flat on the work table 92, and then, the areas from the engagement portions 62C to the coupled portions 64C, which are sewed at the left edge 72c and the right edge 72d of the folded portion 72, are pulled to the right and to the left, and the folded portion 72 is fixed without being loosened. In this state, the engagement portions 62c are fitted on the jigs 93.

It should be noted that, after folding has been completed, the folded portion 72 is inverted on the work table 92 to form a fold 75, or the step of folding the extra portions 77 and the vertical folding step are performed.

When the folded portion 72 is inverted and the inverted body is mounted on the work table 92, the engagement portions 62C may be fitted on the jigs 93, or the folded portion 72 of the air bag 46 may be fixed at the coupled portions 64C. Thus, the steps of forming the fold 75, folding the extra portion 77 and the vertical folding step can be easily performed. That is, the engagement portions 62C are also employed as folding form control portions 66C that include auxiliary engagement portions 71 that hold the jigs 93. Therefore, the engagement holes 71a used for the insertion of the jigs 93 of the auxiliary engagement portions 71 are the same as the engagement holes 62a used for the insertion of the attachment shafts 31.

The processing for folding the air bag 46 using the wrapping sheets 61C of the fourth embodiment will now be described. As shown in FIG. 15 (A), the inflator 28 is stored within the air bag 46, and bolts 30c, which serve as the attachment shafts 31, project outward through attachment holes 48a and one end of a main body 29 protrudes outward through insertion hole 48b.

Following this, the lateral folding process is performed as shown in FIGS. 15 (A and B). That is, horizontal folds LF are formed to reduce the flattened, vertical size of an air bag 46 and produce a folded portion 72. In this embodiment, the portion nearest an upper edge 46a is folded toward a vehicle-side wall 48 in a manner whereby the upper edge 46a is moved nearer a lower edge 46b and the folded portion 72 is obtained. At this time, the folding will have been completed for an entire downstream chamber 59.

Sequentially, as shown in FIGS. 15 (B and C), the entire body is inverted, and the auxiliary engagement portions 71 are held by jigs 93, which are inserted into the engagement holes 71a of the wrapping sheets 61C. And the folding form control portions 66C, which also serve as the engagement portions 62C, are employed to fix, at the coupled portions 64C, the folded portion 72 of the air bag 46 that is being processed.

Furthermore, as shown in FIGS. 15C and 16A, the convex fold 75 is formed in the air bag 46, and the extra portions 77 of the air bag 46, to either side of the inflator 28, are folded inside.

Furthermore, as shown in FIGS. 16 (B, C and D), the vertical folding process is performed to reduce the horizontal size of the air bag 46. In this embodiment, the folded portion 72 is folded so that a left edge 72c and a right edge 72d meet along a center 72f of the folded portion 72, and a folding completed body 79, of the air bag 46, is obtained. Further, the engagement portion 62C of each wrapping sheet 61C is fitted to the attachment shafts, and the engagement holes 62a are fitted on the attachment shafts 31. Then, since the wrapping sheet 61C has thereby wrapped the air bag 46, the shape of the folding completed body 79, of the air bag 46, will be maintained and will not be disarranged.

As well as in the first embodiment, the air bag 46, which has been folded, is mounted on a vehicle. At the time of the operation of a knee protection air bag system S, the wrapping sheet 61C is smoothly torn in consonance with the inflation of the air bag 46, and ejects and expands the air bag 46 from a main body 18 of a case 17.

According to the wrapping sheets 61C of the fourth embodiment, since the auxiliary engagement portions 71 of the folding form control portions 66C are held at the jigs 93 on the work table 92, the folded portion 72 of the air bag 46 can be fixed at the coupled portions 64C. Therefore, after the air bag 46 being processed has been inverted, folding can be smoothly continued without the coupled portions 64C of the air bag 46 being aligned. Therefore, a folding completed shape of the air bag 46 can be easily obtained. Furthermore, since the auxiliary engagement portions 71 can also be employed as the engagement portions 62C, the wrapping sheets 61C can be compactly made, compared with when the auxiliary engagement portions 71 and the engagement portions 62C are separately provided.

In the above embodiments, the coupled portions 64, 64A, 64B or 64C have been provided for the air bag 46 by sewing. However, bonding may be employed. Further, as an example wrapping sheet for the present invention, a portion employed as a wrapping sheet may be integrally formed with a member that serves as the outer wall of the air bag 46, and a location whereat the wrapping sheet is connected to the air bag may be designated a coupled portion.

Further, the embodiments have been described by employing, as examples, the wrapping sheets 61, 61A, 61B and 61C, which are employed for the air bag 46 of the knee protection air bag system S arranged below the steering column 9 to protect the knees K of the driver MD. However, the wrapping sheet of the present invention can also be applied for the air bag of a knee protection air bag system provided in front of a passenger seat, and of a head protection air bag system mounted on a passenger seat and a driver seat.

What is claimed is:

1. A wrapping sheet to maintain a shape of a folded air bag and tearable when subjected to pressure at inflation of the air bag,
wherein an engagement piece is fitted on attachment shafts, projecting from the air bag, for attachment to a storage portion for storing the folded air bag, so that when the engagement piece has been fitted on the attachment shafts, the shape of the folded air bag is maintained;

wherein a coupling portion is arranged for coupling with part of the air bag to form a coupled portion, and the engagement piece is located at a portion extending from the coupled portion; and wherein a folding form control portion includes an auxiliary engagement portion to be fitted either to the attachment shafts or to a jig in a vicinity of the folded air bag, and engages the auxiliary engagement portion with the attachment shafts, or the jig, in order to control the shape of the air bag while being folded, the air bag having a first folded part and a second folded part, the first folded part being restrained so as to not be unfolded by the folding form control portion of the wrapping sheet, and the second folded part being formed by further folding the first folded part across the folds thereof, the second folded part being restrained on a face thereof opposite to the first folded part by a portion of the wrapping sheet extending from the coupled portion at the first folded part and around the second folded part to the engagement piece.

2. A wrapping sheet according to claim 1, wherein the air bag in the flat state is folded through a plurality of folding steps;

wherein, when, at the next to last step, the coupled portion is positioned on the outer face of a folded portion of the air bag, the auxiliary engagement portion of the folding form control portion is employed as an auxiliary, attachment shaft engagement portion, which is to engage the attachment shafts when the coupled portion is positioned to the outer wall of the folded portion of the air bag; and wherein, when the auxiliary, attachment shaft engagement portion is fitted to the attachment shafts, a section from the coupled portion to the auxiliary, attachment shaft engagement portion is employed as an auxiliary wrapping section that wraps the folded portion, so that the disarrangement of the folded portion is prevented.

3. A wrapping sheet according to claim 2, wherein the coupled portion is located along an end edge of the folded portion when the auxiliary, attachment shaft engagement portion is fitted on the attachment shafts; and wherein the engagement piece is fitted on the attachment shafts, so that the coupled portion is exposed at an end edge of a body of the air bag in the folding completed shape.

4. A wrapping sheet according to claim 1, wherein the coupled portion is located at a portion of the air bag that becomes a convex fold;

wherein the auxiliary engagement portion of the folding form control portion is employed as an auxiliary, attachment shaft engagement portion that is to engage the attachment shafts during the process for folding the air bag;

wherein, when a portion of the air bag is extracted to form a convex fold during the folding process, the auxiliary, attachment shaft engagement portion engages the attachment shafts; and wherein, when the auxiliary, attachment shaft engagement portion is fitted on the attachment shafts, the section from the coupled portion to the auxiliary, attachment shaft engagement portion is provided as a fold forming portion that extracts a portion of the air bag and forms a convex fold.

5. A wrapping sheet according to claim 1, wherein, when a plurality of folding steps are to be performed on a work table used for folding an air bag, beginning with a flat state and by reversing the sides, the auxiliary engagement portion of the folding form control portion is employed as an auxiliary, jig engagement portion that engages, during a folding process, a jig that is located on the work table;

wherein, when the auxiliary, jig engagement portion engages the jig, a folded portion near the coupled portion is securely fixed; and wherein, when the air bag has been folded, the auxiliary, jig engagement portion is also employed as an engagement piece that engages the attachment shafts to maintain the air bag in shape when the folding process has been completed.

6. A wrapping sheet according to claim 1, wherein the second folded part is formed by further folding the first folded part so that left and right edges of the first folded part meet along a center of the first folded part to form a folding completed body; and the engagement portion is wrapped around the folding completed body to maintain the shape of the airbag, and the wrapping sheet is disposed to enclose the folding completed body in its entirety.

* * * * *